United States Patent
Kim et al.

(10) Patent No.: US 7,916,623 B2
(45) Date of Patent: Mar. 29, 2011

(54) METHOD OF ALLOCATING WIRELESS RESOURCES IN A MULTI-CARRIER SYSTEM

(75) Inventors: Hak Seong Kim, Seoul (KR); Bong Hoe Kim, Anyang-si (KR); Dong Wook Roh, Seoul (KR); Joon Kui Ahn, Seoul (KR); Dong Youn Seo, Seoul (KR); Jung Hoon Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 737 days.

(21) Appl. No.: 11/917,475

(22) PCT Filed: Jun. 13, 2006

(86) PCT No.: PCT/KR2006/002254
§ 371 (c)(1),
(2), (4) Date: Dec. 13, 2007

(87) PCT Pub. No.: WO2006/135187
PCT Pub. Date: Dec. 21, 2006

(65) Prior Publication Data
US 2009/0303938 A1     Dec. 10, 2009

Related U.S. Application Data

(60) Provisional application No. 60/711,087, filed on Aug. 23, 2005, provisional application No. 60/722,922, filed on Sep. 30, 2005.

(30) Foreign Application Priority Data

Jun. 15, 2005  (KR) .................. 10-2005-0051558
Jan. 17, 2006  (KR) .................. 10-2006-0005069
Jan. 23, 2006  (KR) .................. 10-2006-0006670
Apr. 27, 2006  (KR) .................. 10-2006-0038377

(51) Int. Cl.
*H04J 11/00*     (2006.01)
(52) U.S. Cl. ......... 370/208; 370/210; 370/328; 370/468
(58) Field of Classification Search ................... None
See application file for complete search history.

(56) References Cited

U.S. PATENT DOCUMENTS

| | | | |
|---|---|---|---|
| 7,639,660 B2 * | 12/2009 | Kim et al. | 370/343 |
| 2004/0057402 A1 * | 3/2004 | Ramos et al. | 370/329 |
| 2005/0068884 A1 | 3/2005 | Yoon et al. | |

FOREIGN PATENT DOCUMENTS

| | | |
|---|---|---|
| EP | 1533966 | 5/2005 |
| WO | 2004077777 | 9/2005 |

* cited by examiner

*Primary Examiner* — Bob A Phunkulh
(74) *Attorney, Agent, or Firm* — Lee, Hong, Degerman, Kang & Waimey

(57) ABSTRACT

A method of allocating wireless resources in a wireless communication system is disclosed. More specifically, the method includes allocating distributed chunks to at least one user equipment (UE) on a frequency domain, wherein the distributed chunks are localized chunks which are allocated to the wireless resources according to a distributed allocation scheme, constructing a map for allocating localized chunks in consideration of the allocated distributed chunks, wherein the localized chunks are the localized chunks allocated to the wireless resources according to a localized allocation scheme, and allocating the localized chunks to the at least one UE after all of the distributed chunks are allocated. Here, the distributed chunks and the localized chunks are mutually exclusive.

28 Claims, 15 Drawing Sheets

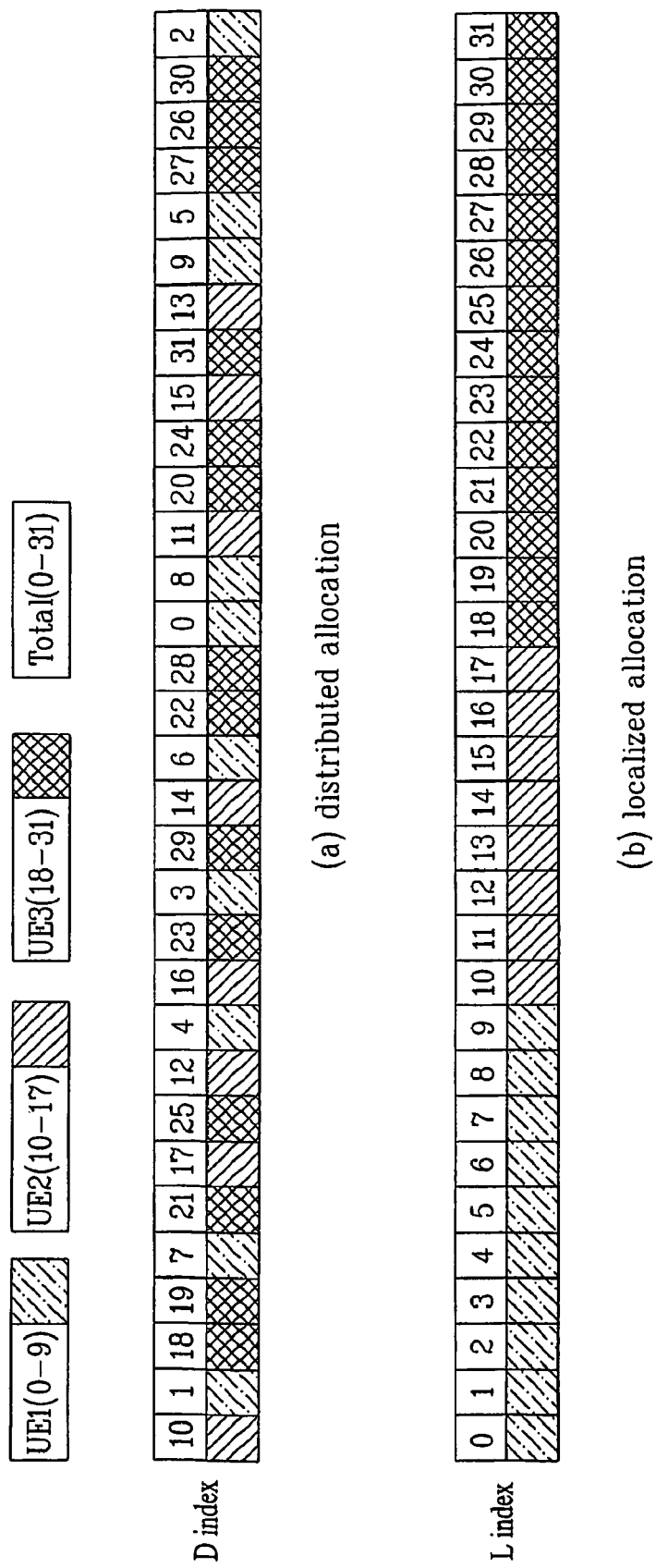

UE1 : Chunk_D1~2 allocation
UE2 : Chunk_D3 allocation
UE3 : Chunk_L1~4 allocation
UE4 : Chunk_L5~7 allocation

METHOD OF ALLOCATING WIRELESS RESOURCES IN A MULTI-CARRIER SYSTEM

CROSS-REFERENCE TO RELATED APPLICATIONS

This application is a 371 U.S. national stage application of international application PCT/KR2006/002254, filed on Jun. 13, 2006, which claims priority to U.S. provisional applications 60/711,071, filed on Aug. 23, 2005, 60/711,087, filed on Aug. 23, 2005, and 60/722,922, filed on Sep. 30, 2005, and Korean patent applications 10-2005-0051558, filed on Jun. 15, 2005, 10-2006-0005069, filed on Jan. 17, 2006, 10-2006-0006670, filed on Jan. 23, 2006, and 10-2006-0038377, filed on Apr. 27, 2006, the contents of which are hereby incorporated by reference herein in their entirety.

TECHNICAL FIELD

The present invention relates to a method of allocating wireless resources, and more particularly, to a method of allocating wireless resources in a multi-carrier system.

BACKGROUND ART

A basic principle behind an Orthogonal Frequency Division Multiplexing (OFDM) entails dividing high rate data stream into a large number of slow rate data stream and transmitting simultaneously these slow rate data stream using a plurality of carriers. Here, each of the plurality of carriers is referred to as a subcarrier. In the OFDM system, the plurality of carriers enjoys orthogonality with each other. As such, even if the frequency elements of the carriers overlap, it is possible for the receiving end to detect the signals. In addition, the data stream having high data rate are passed through a serial-to-parallel converter and are converted into a plurality of low rate data stream. The converted plurality of data stream is multiplied by each subcarrier and thereafter, each data rate is combined with each other before being transmitted to the receiving end.

The plurality of parallel data stream generated by the serial-to-parallel converter can be transmitted on the plurality of subcarriers after being processed by Inverse Discrete Fourier Transform (IDFT). The IDFT can be applied an Inverse Fast Fourier Transform (IFFT) for efficient reconstruction.

Since a symbol duration of the subcarriers having low data rate increases, relative signal dispersion caused by multi-path delay spread in relation to time decreases. It is possible to reduce Inter-Symbol Interference (ICI) by interjecting a guard interval whose length is longer than that of the length of channel delay spread between OFDM symbols. In addition, a part of the OFDM signal can be duplicated and placed at the starting portion of the symbol in the guard interval. As a result, the OFDM symbol can become cyclically extended and protect the symbol.

Hereafter, a conventional Discrete Fourier Transform Spreading OFDM (DFT-S-OFDM) scheme will be explained. The DFT-S-OFDM scheme can also be referred to as a Single Carrier-Frequency Division Multiple Access (SC-FDMA). The conventional SC-FDMA scheme is usually applied in the uplink. In operation, spreading is applied using the DFT matrix in the frequency domain prior to generating the OFDM signal. Thereafter, the output is modulated according to the conventional OFDM scheme and then transmitted.

In the SC-FDMA scheme, the data symbols are spread by the DFT matrix before being transmitted. In the following equation, 'N' represents a number of the subcarriers used to transmit the OFDM signals, '$N_b$' represents a number of subcarriers for a temporary user, 'F' represents the DFT matrix, 's' represents a data symbol vector, 'x' represents a data spread vector in the frequency domain, and 'y' represents an OFDM symbol vector transmitted in the time domain. Based on these elements, the SC-FDMA scheme can be explained according to Equation 1.

$$x = F_{N_b \times N_b} s \qquad \text{[Equation 1]}$$

In Equation 1, $F_{N_b \times N_b}$ is a DFT matrix, whose size is represented by $N_b$, used for spreading the data symbols. Subcarrier mapping is performed according to a subcarrier allocation method on vector x which is the vector spread by the DFT matrix. Thereafter, the data spread vector is converted from the frequency domain to time domain to acquire the signal for transmitting to the receiving end. The equation related to the transmission signal for the receiving end is as follows.

$$y = F_{N \times N}^{-1} x \qquad \text{[Equation 2]}$$

In Equation 2, $F_{N \times N}$ represents a DFT matrix having a size of N used for converting the signal of the frequency domain to time domain signal. The signal y generated in the course of the procedure is applied a cyclic prefix thereto and then transmitted. Here, the scheme used for generating and transmitting the signal to the receiving end is based on the SC-FDMA scheme. The size of the DFT matrix can vary depending on use and/or purpose. For example, if the size of the DFT matrix is same as the number of IDFT points, a Peak-to-Average Power Ratio (PAPR) of the transmitting end can be reduced.

Hereafter, the OFDM Access (OFDMA) will be explained. The OFDMA is a multiple access scheme which provides a part of available subcarriers to each user using a modulation system employing an orthogonal plurality of subcarriers. The OFDMA provides frequency resources (e.g., subcarriers) to each user. These frequency resources are independently provided to a plurality of users and thus conflict between users can be generally avoided.

Hereafter, general OFDMA transmitting/receiving devices are explained. FIG. 1 is a block diagram illustrating downlink transmitting/receiving ends according to a conventional art.

In the transmitting end, a bit stream is mapped according to a constellation mapping scheme using modulation techniques such as Quadrature Phase Shift Keying and 16 Quadrature Amplitude Modulation. That is, the bit stream is mapped as a specific data symbol, and the data symbol is converted into a parallel data symbol after passing through a serial-to-parallel converter. In the conversion, a number of converted data symbols (i.e., Nu(n)) that are converted correspond directly to a number of subcarriers allocated to each user (n). As illustrate in FIG. 1, the bit stream for user 1 is converted to parallel data symbols Nu(1) number of allocated subcarriers. The number of subcarriers allocated to each user can be same or different. Furthermore, the data symbol size (Nu(n)) for each user can be same or different as well.

The converted parallel data symbols are mapped to Nu(n) number of subcarriers which is allocated to nth user out of Nc number of subcarriers. The remaining (Nc-Nu(n)) number of subcarriers are mapped to other users. Using a symbol-to-subcarrier mapping module, un-allocated subcarriers are padded with '0' (e.g., zero padding). The resulting output of the symbol-to-subcarrier mapping module is thereafter inputted into a Nc-Point Inverse Fast Fourier Transform (IFFT) module.

In attempt to reduce Inter-Symbol Interference (ISI), the output of the IFFT module is first added to a cyclic prefix and passed through a parallel-to-serial converter module before being transmitted.

The conventional OFDMA receiving device operates in reverse order from that of the transmitting device. More specifically, the received data symbols are passed through the serial-to-parallel converter module, followed by the Nc-Point FFT, before being processed at the subcarrier-to-symbol mapping module. Thereafter, the data symbols are decoded by the constellation demapping module.

Hereafter, resource allocation in the OFDMA system will be explained. In the entire frequency broadband, specific frequency resources (e.g., subcarriers) are allocated to specific users. In other words, the allocated frequency resources are not shared with another user. More specifically, in allocating the frequency resources to the user(s) in the OFDMA, information on subcarrier allocation has to be sent to a mobile station (MS) from a base station (BS) so that the users can receive the allocated frequency resources. If allocation information for all of the subcarriers to be sent to the MS, the amount of information would be too large, and to minimize the allocation information being sent, a plurality of subcarriers can be grouped into 'chunks' before being sent to the MS.

FIG. 2 illustrates allocating subcarriers in units of chunks to a specified user. As illustrated in FIG. 2, there are various allocation methods by which to allocate the subcarriers in chunks, including a distributed allocation method and a localized allocation method, for example. Each arrow represents chunks, which is comprised of a plurality of grouped subcarriers.

The distributed allocation method of FIG. 2 allocates the chunks provided across the broadband of the authorized communication system to a specified user when a specified number of chunks from total number of chunks are allocated. By allocating the chunks provided across the broadband to the specified user, diversity gain can be achieved in the frequency domain. The allocation method of FIG. 2 depicts grouping chunks that are close to each other (neighbor chunks) and allocating the chunks to the specified user.

FIG. 3 illustrates a distributed allocation method and a localized allocation method. More specifically, FIG. 3 illustrates the distributed allocation method and the localized allocation method in an environment where there are a total of 32 chunks while 10 chunks are allocated to UE1, 8 chunks are allocated to UE2, and 14 chunks are allocated to UE3. Here, the chunk indices are different according to each allocation method. The distributed allocation method (a) of FIG. 3 represents an index with randomly allocated chunks. In addition, the localized allocation method (b) of FIG. 3 represents an index with chunks grouped in groups.

If the BS and the MS are sharing the indices, the allocation information that needs to be provided by the BS to the MS for proper reception is the available index per user and whether a distributed or localized allocation is used. In detail, for UE1, which receives data via 0-9 chunks, a first/start index 0 and a last/end index 9 are transmitted. Moreover, for UE2, which receives data via 10-17 chunks, a first index 10 and an last index 17 are transmitted. Furthermore, for UE3, which receives data via 18-31 chunks, a first index 18 and a last, index 31 are transmitted. In the transmission of the first and last indices, information on whether localized chunks or distributed chunks are used is transmitted to each UE.

DISCLOSURE OF THE INVENTION

Accordingly, the present invention is directed to a method of allocating wireless resources in a multi-carrier system that substantially obviates one or more problems due to limitations and disadvantages of the related art.

An object of the present invention is to provide a method of allocating wireless resources in a wireless communication system.

Another object of the present invention is to provide a method of receiving allocated wireless resources in a wireless communication system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of allocating wireless resources in a wireless communication system includes allocating distributed chunks to at least one user equipment (UE), wherein the distributed chunks are localized chunks which are allocated to the wireless resources according to a distributed allocation scheme, constructing a map for allocating localized chunks in consideration of the allocated distributed chunks, wherein the localized chunks are the localized chunks allocated to the wireless resources according to a localized allocation scheme, and allocating the localized chunks to the at least one UE after all of the distributed chunks are allocated. Here, the distributed chunks and the localized chunks are mutually exclusive.

In another aspect of the present invention, the method of receiving allocated wireless resources in a wireless communication system includes receiving an indicator from a transmitting end, wherein the indicator indicates a chunk type, wherein the chunk type includes distributed chunks and localized chunks, determining, first, the allocated wireless resources of the distributed chunks using a first allocated chunk and a last allocated chunk of the distributed chunks, determining, second, the last chunk allocated as the distributed chunk after all of the distributed chunks are allocated, and determining, third, the allocated wireless resources of the localized chunks using a first allocated chunk and a last allocated chunk of the localized chunks. Here, the wireless resources allocated to the distributed chunks are mutually exclusive with the localized chunks.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings;

FIG. 3 illustrates a distributed allocation method and a localized allocation method;

FIG. 4b illustrates frequency hopping at every symbol;

FIG. 5b illustrates frequency hopping at every symbol;

BEST MODE FOR CARRYING OUT THE INVENTION

Reference will now be made in detail to the preferred embodiments of the present invention, examples of which are illustrated in the accompanying drawings. Wherever possible, the same reference numbers will be used throughout the drawings to refer to the same or like parts.

In the present invention, data from at least one user is transmitted on a plurality of subcarriers, which maintain orthogonality between the subcarriers. To this end, various schemes can be used including OFDM, OFDMA, and SC-FDMA.

Figure 1:
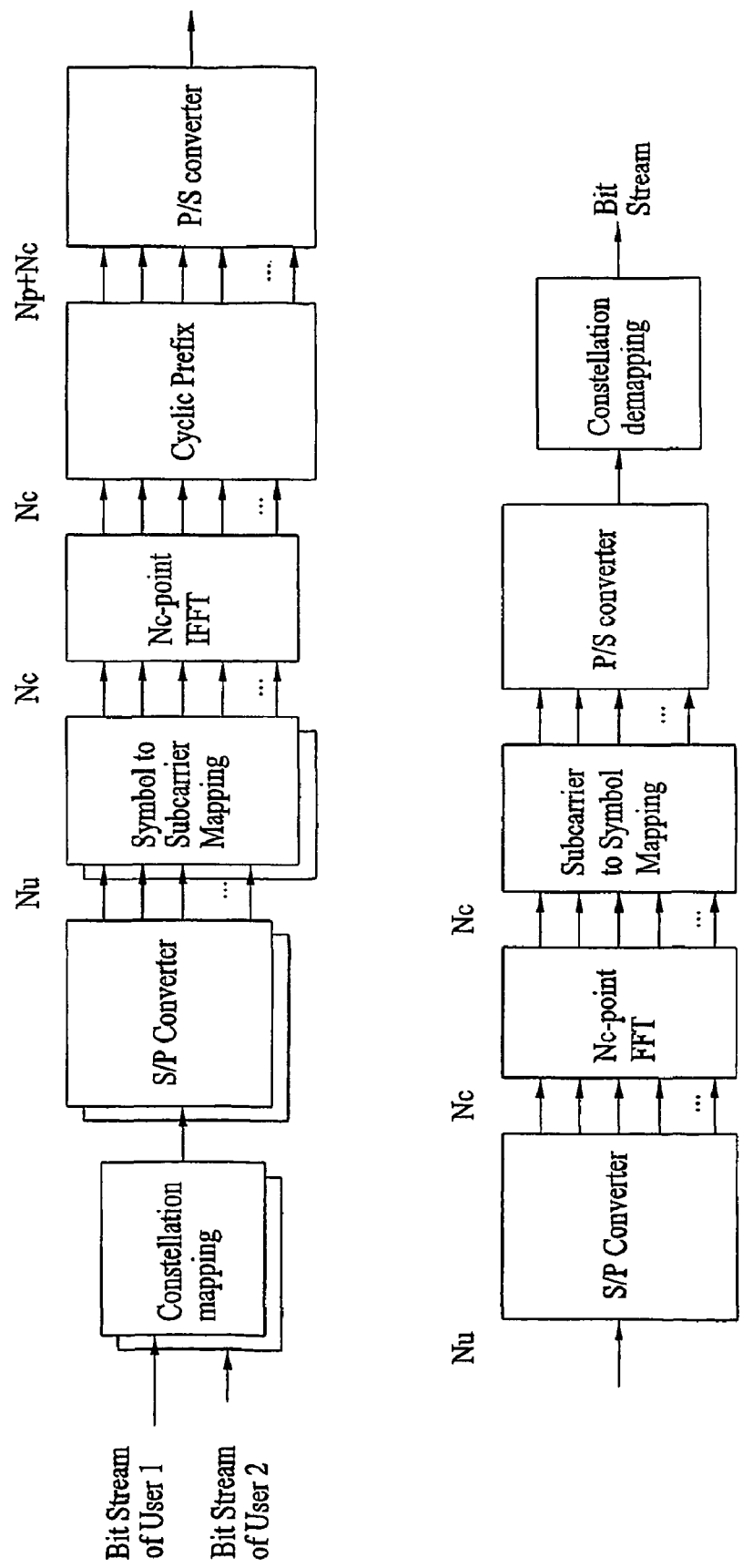
FIG. 1 is a block diagram illustrating downlink transmitting/receiving ends according to a conventional art.
Figure 2:
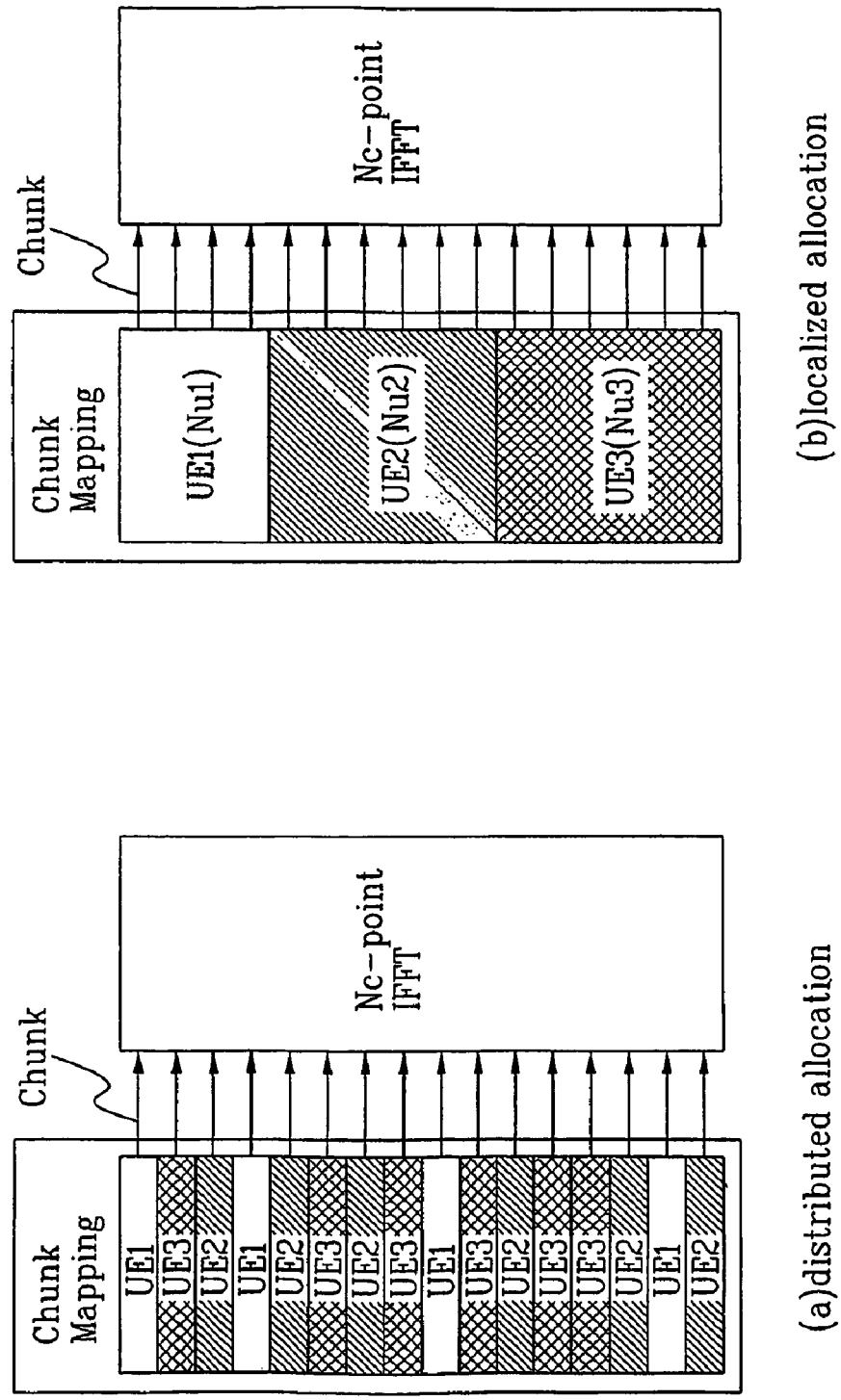
FIG. 2 illustrates allocating subcarriers in units of chunks to a specified user.

In operation, the resources are allocated in units of chunks. That is, a chunk is comprised of at least one subcarrier. Preferably, the chunk according to the present invention can be classified into two types. The first type refers to the subcarriers that are close/adjacent to each other or neighboring subcarriers. The chunks depicted in FIG. 2 illustrate the chunks of the first type. Hereafter, the neighboring subcarriers (the chunks of the first type) will be referred to as 'localized chunk' or 'Chunk_L.'

The second type refers to the subcarriers that are not close/adjacent to each other but apart from each other. That is, the subcarriers are distributed. Hereafter, the second type of chunks will be referred to as 'distributed chunk' or 'Chunk_D.'

The localized chunks can be allocated to the UE according to the distributed allocation scheme as illustrated in FIG. 2(a) or alternatively, the localized chunks can be allocated to the UE according to the localized allocation scheme as illustrated in FIG. 2(b). Similarly, the distributed chunks can be allocated the UE according to the distributed allocation scheme as illustrated in FIG. 2(a) or alternatively, the localized chunks can be allocated to the UE according to the distributed allocation scheme as illustrated in FIG. 2(b).

While the classification of the localized chunks and the distributed chunks relate to how the chunks are generated, the classification of the localized allocation scheme and the distributed allocation scheme relate to how the generated chunks are to be allocated to the user(s).

In the present invention, the two types of chunks and the two types of allocation methods can be applied in any combination. A more detailed operation, characteristics, and effects associated with the present invention will become more apparent with the descriptions of the embodiments.

Embodiment #1

In embodiment #1, a method of allocating resources using localized chunks will be explained. More specifically, a distributed allocation scheme is first applied to the localized chunk, and then, the localized allocation scheme is additionally applied.

Figure 4A:
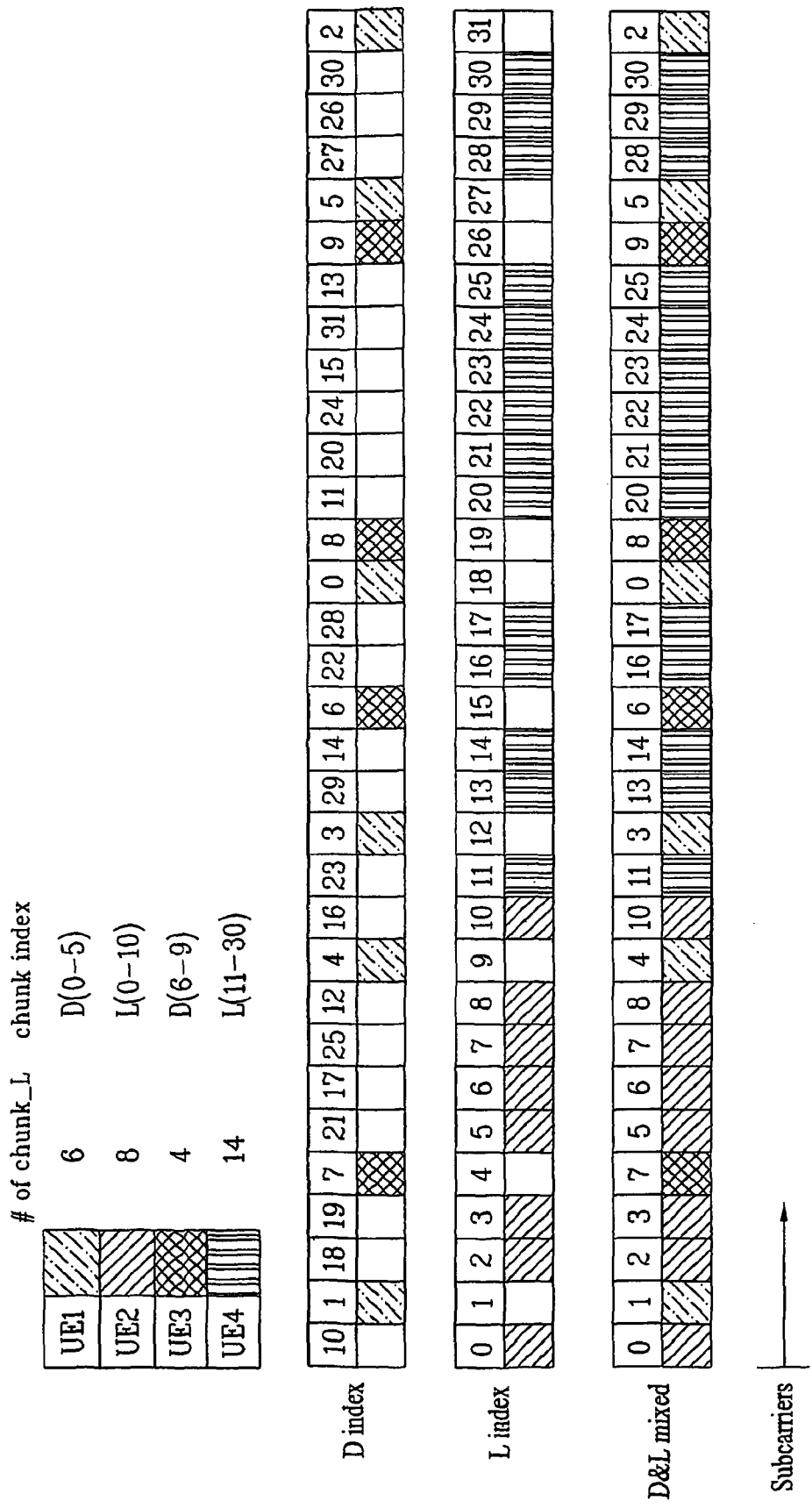
FIG. 4a illustrates application a distributed allocation scheme and a localized allocation scheme to a localized chunk.

FIG. 4a illustrates application a distributed allocation scheme and a localized allocation scheme to a localized chunk. A transmitting end having scheduler function (e.g., base station) configures 'D Index' which includes chunks that are allocated according to a distributed allocation scheme, and 'L Index' to apply a localized allocation scheme. Information related to D Index and L Index can be defined and shared with the transmitting and the receiving ends or can be provided by the transmitting end to the receiving end (e.g., UE). If the information is transmitted from the transmitting end to the receiving end, layer signaling can be used to accomplish this.

Each index (i.e., D Index or L Index) represents a compilation of specific chunks. Here and in the descriptions of the embodiments to follow, allocating a specific index to a specific user signifies allocating a specific chunk to a specific user. As such, the specific user can send data using the subcarriers allocated to the chunk.

In FIG. 4a, D Index and L Index represent chunks allocated to each user (e.g., UE). Moreover, because L Index is associated with specific frequency resource, the indices of L Index are consecutively allocated (or put differently, in continuous numbers) while the index of D Index is assigned randomly (or put differently, apart from each other). That is, L Index represents consecutive indices to specific frequency resources, and D Index represents assigning indices in random order to specific frequency resources. Preferably, D Index is generated in such a manner where the frequency resources of neighboring indices that are distributed or apart are used.

By using D Index and L Index, communication between the transmitting end and the receiving end can be simplified.

In FIG. 4a, there are a total of 32 chunks ($N_T$=32). UE1 and UE3 are allocated Chunk_Ls or localized chunks according to the distributed allocation scheme. Furthermore, UE2 and UE4 are allocated Chunk_Ls or localized chunks according to the localized allocation scheme. Here, UE1 is allocated six (6) Chunk_Ls, and UE3 is allocated four (4) Chunk_Ls, both according to the distributed allocation scheme. Moreover, UE2 is allocated 8 Chunk_Ls, and UE4 is allocated 14 Chunk_Ls, both according to the localized allocation scheme.

The transmitting end according to the present embodiment can allocate Chunk_Ls to index 0-index 5 of D Index and index 6-index 9 of D Index. Even though adjacent Chunk_Ls are consecutively allocated to UE1 and UE3, the distributed allocation scheme is applied to Chunk_Ls based on the characteristics of D Index.

After the chunks have been allocated according to the distributed allocation scheme to configure D Index, L Index is configured based on the localized allocation scheme. That is, UE2 is allocated the localized chunks (i.e., Chunk_Ls) to index 0-index 10, and UE4 is allocated Chunk_Ls to index 11-index 30. Here, in order to assign eight (8) chunks to UE2, index 0-index 7 of L Index can be used. However, since the localized chunks have already been allocated according to the distributed allocation scheme, the allocated chunks occupying the same frequency slot, if combined, should not be allocated again. As such, non-overlapping or non-occupied indices from index 0-index 10 of L Index are used to allocate the remaining Chunk_Ls to UE2. The remaining Chunk_Ls refer to Chunk_Ls excluding already allocated Chunk_Ls by the distributed allocation scheme. The same allocation scheme as described above with respect to allocating eight (8) chunks to index 0-index 7 can be applied to allocating Chunk_Ls to index 11-index 31 of L Index.

The allocation scheme according to embodiment #1 can use the distributed allocation scheme and the localized allocation scheme for allocating Chunk_Ls. Furthermore, two indices having different characteristics are used to indicate the allocated chunks. By receiving information regarding the allocated chunks labeled by the indices, the receiving end can properly identify the allocated chunks.

According to embodiment #1 of FIG. 4a, two indices having different characteristics are used, but it is possible to use a single index. That is, instead of using D Index and L Index independently, either L Index or D Index can be used, for example. Even if either of the distributed allocation scheme or the localized allocation scheme is used, both the distribution allocation scheme and the localized allocation scheme can be applied. Here, if the distributed allocation scheme is applied, adjacent slots of the indices should not be assigned. That is, index 0-index 5, which are consecutive and adjacent, should not be assigned to UE1, but non-adjacent or non-consecutive indices 1, 9, 12, 18, 27, 31 should be assigned. As discussed above, the distributed allocation scheme assigns the chunks designated for the same user to be apart from each other. Generally, it is more advantageous to use an index having assigned adjacent or consecutive indices to reduce signaling, and therefore, it is preferable to use two indices (e.g., D Index and L Index) having different characteristics.

Besides a method of notifying chunk allocation from the transmitting end to the receiving end by providing a first index and a last index, as an alternative, the transmitting end can provide the first index (or starting index) and a number of chunks that are being used. That is, for UE1, information of the first or starting index (i.e., index 0) of D Index and the number of chunks used (i.e., 6) are transmitted. In addition, for UE2, information of the first index (i.e., index 6) of D Index and the number of chunks used (i.e., 4) are transmitted, and for UE3, information on the first index (i.e., index 0) of L Index and the number of chunks used (i.e., 8) are transmitted. Lastly, for UE4, information on the first index (i.e., index 11) and the number of chunks used (i.e., 14) are transmitted.

Further, the localized chunk (i.e., Chunk_L) for D Index can be manipulated at certain intervals or at every certain number of OFDM symbols so as to allow frequency hopping. The frequency hopping scheme is described with respect to FIG. 4b.

Figure 4B:
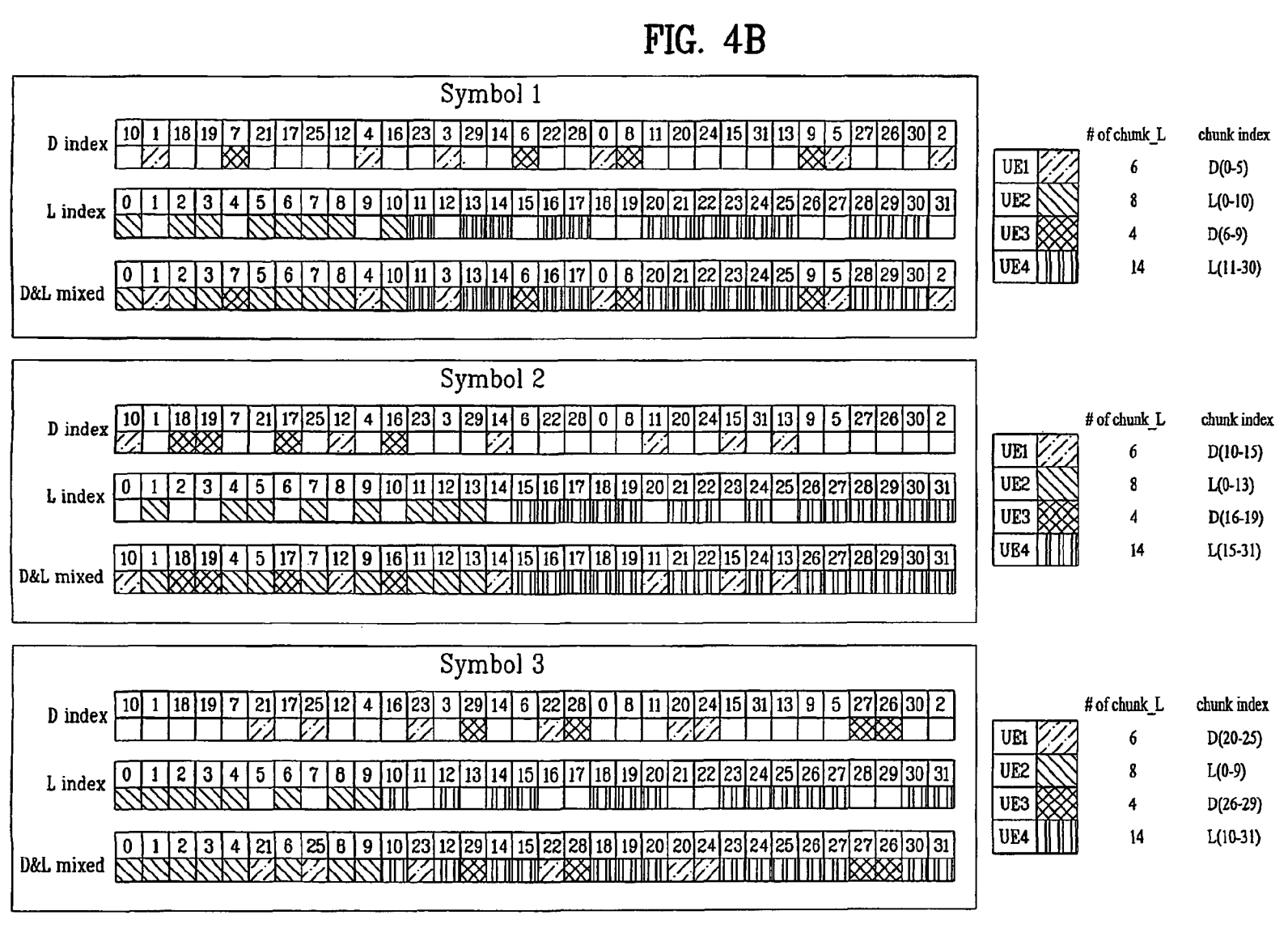

FIG. 4b illustrates frequency hopping at every symbol. In a first symbol, the resources (e.g., chunks) are allocated as same as that of FIG. 4a. In a second symbol, allocation of Chunk_Ls in D Index is different. That is, in the first symbol, index 0-index 5 of D Index are allocated to UE1 while index 6-index 9 of D Index are allocated to UE3. However, in the second symbol, index 10-index 15 of D Index can be allocated to UE1 while index 16-index 19 of D Index can be allocated to UE3. In addition, allocation of Chunk_Ls in L Index can be implemented in a manner in which Chunk_Ls of L Index do not overlap with Chunk_Ls of D Index. Although each UE can be assigned a certain number of chunks, each UE is assigned different frequency resources from those of the first symbol.

In a third symbol, allocation of Chunk_Ls of D Index is different as well from the allocation of Chunk_Ls of the previous symbol (i.e., second symbol). That is, in the second symbol, index 10-index 15 are allocated to UE1 while index 16-index 19 are allocated to UE3. However, in the third symbol, index 20-index 25 can be allocated to UE1 while index 26-index 29 can be allocated to UE3. In addition, allocation of Chunk_Ls of L Index can be implemented in a manner in which Chunk_Ls of L Index do not overlap with Chunk_Ls in D Index. Although each UE can be assigned a certain number of chunks, each UE is assigned different frequency resources from those of the second symbol.

Embodiment #2

In embodiment #2, a method of allocating resources using localized chunks will be explained. More specifically, a distributed allocation scheme is first applied to the localized chunk, and then, the localized allocation scheme is additionally applied. In embodiment #1 of the present invention, a specific user (i.e., UE) is allocated at least one chunk, and the chunk can be allocated to one UE only. However, in embodiment #2, one chunk can be allocated to more than one UE.

Figure 5A:
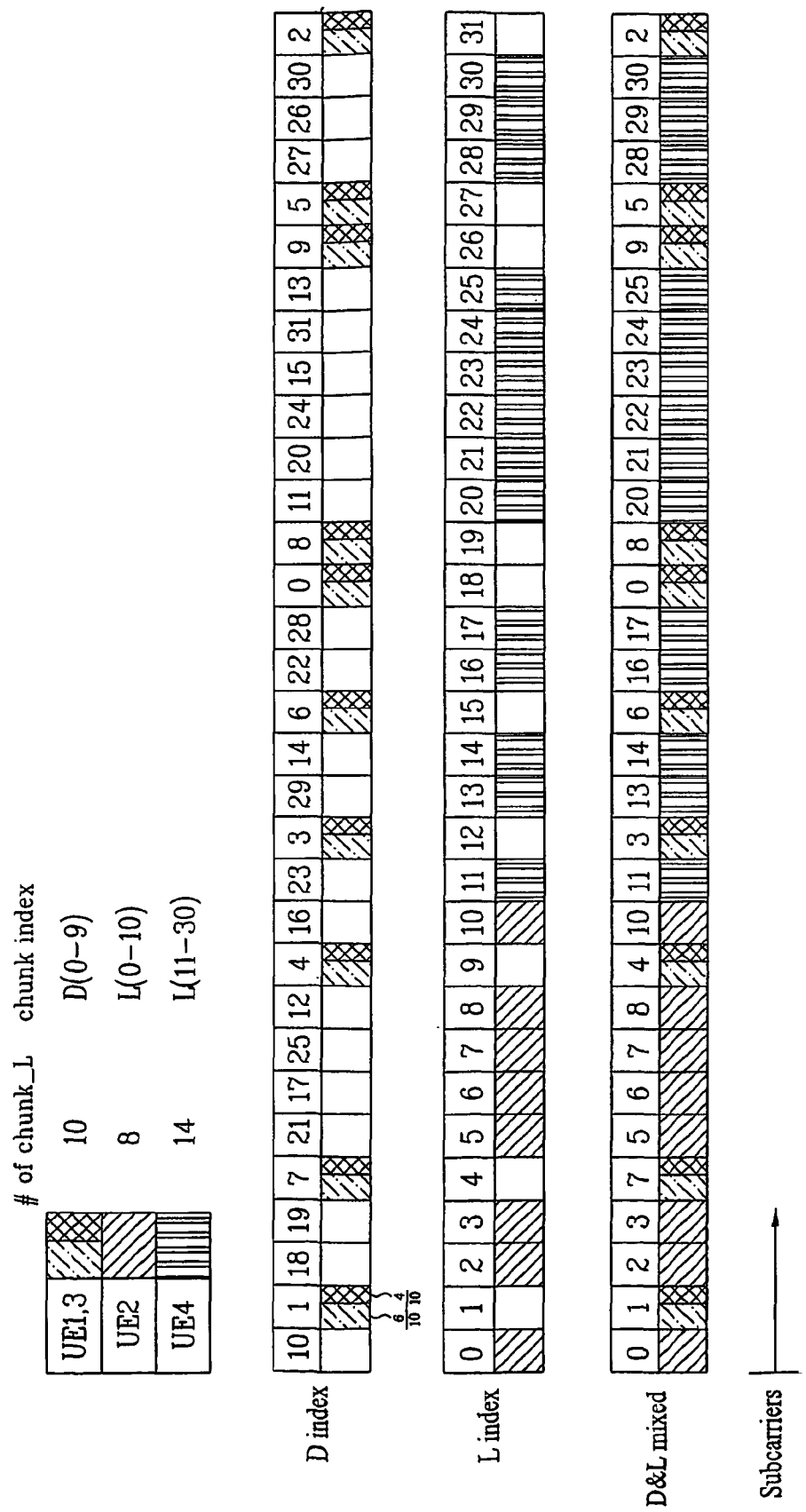
FIG. 5a illustrates applying a distributed allocation scheme and a localized allocation scheme to a localized chunk.

FIG. 5a illustrates applying a distributed allocation scheme and a localized allocation scheme to a localized chunk (i.e., Chunk_L). A transmitting end having scheduling function (e.g., base station) configures 'D Index' by applying a distributed allocation scheme and 'L Index' by applying a localized allocation scheme. Information of D Index and L Index can be defined and shared with the transmitting and the receiving ends or can be transmitted to the receiving end (e.g., UE). If the information is transmitted from the transmitting end to the receiving end, layer signaling can be used to accomplish this.

Each index (i.e., D Index and L Index) represents a specific chunk. Here and in the descriptions of the embodiments to follow, allocating a specific index to a specific user signifies allocating a specific chunk to a specific user. As such, the specific user can send data using the subcarriers allocated to the chunk.

In FIG. 5a, D Index and L Index represent chunks allocated to each user (e.g., UE). Moreover, because L Index is associated with specific frequency resource, the indices of L Index are consecutively allocated (or put differently, in continuous numbers) while the index of D Index is assigned randomly (or put differently, apart from each other). That is, L Index represents assigning consecutive indices to specific frequency resources, and D Index represents assigning indices in random order to specific frequency resources. Preferably, D Index is generated in such a manner where the frequency resources of neighboring indices that are distributed or apart are used.

By using the two types of indices, communication between the transmitting end and the receiving end can be simplified.

In FIG. 5a, there are a total of 32 chunks ($N_T$=32). UE1 and UE3 are allocated Chunk_Ls according to the distributed allocation scheme. Furthermore, UE2 and UE4 are allocated Chunk_Ls according to the localized allocation scheme. More specifically, UE1 and UE3 together are allocated thereto 10 localized chunks (i.e., Chunk_Ls) according to the distributed allocation scheme. In this situation, UE1 and UE3 are allocated in a mutually exclusive manner wireless resources of a specific Chunk_L. That is, if UE1 is allocated Chunk_L to index 1 of D Index, UE1 is allocated six (6) out of 10 subcarriers of Chunk_L and the remaining four (4) subcarriers of Chunk_L are allocated to UE3. Furthermore, UE2 is allocated eight (8) Chunk_Ls according to the localized allocation scheme, and UE4 is allocated 14 Chunk_Ls according to the localized allocation scheme.

The transmitting end (e.g., base station) can allocate to UE1 and UE3 Chunk_Ls which are assigned to index 0-index 9 of D Index. Even though adjacent Chunk_Ls are consecutively allocated to UE1 and UE3, the distributed allocation scheme is applied to Chunk_Ls based on the characteristics of D Index.

After D Index is applied, the application of L Index follows. That is, UE2 is allocated Chunk_Ls to index 0-index 10, and UE4 is allocated Chunk_Ls to index 11-index 30. Here, in order to assign 8 chunks to UE2, index 0-index 7 of L Index can be used. However, since the chunks already allocated according to the distributed allocation scheme should not be allocated again, index 0-index 10 of L Index is used to allocate the remaining Chunk_Ls to UE2. The remaining Chunk_Ls refer to Chunk_Ls excluding already allocated Chunk_Ls. The same allocation scheme as described above with respect to allocating 8 chunks to index 0-index 7 can be applied to allocating Chunk_Ls to index 11-index 31 of L Index.

The allocation scheme according to embodiment #2 can use the distributed allocation scheme and the localized allocation scheme for allocating Chunk_Ls. Furthermore, two indices having different characteristics are used indicate the allocated chunks. By receiving information regarding the allocated chunks labeled by the indices, the receiving end can properly identify the allocated chunks.

That is, instead of using D Index and L Index independently, either L Index or D Index can be used, for example. Even if either of the distributed allocation scheme or the localized allocation scheme is used, both the distribution allocation scheme and the localized allocation scheme can be applied. Here, if the distributed allocation scheme is applied, adjacent slots of the indices should not be assigned. Generally, it is more advantageous to use an index having assigned adjacent or consecutive indices to reduce signaling, and therefore, it is preferable to use two indices (e.g., D Index and L Index) having different characteristics.

Further, the localized chunk (i.e., Chunk_L) for D Index can be manipulated at certain intervals or at every certain number of OFDM symbols so as to allow frequency hopping. The frequency hopping scheme is described with respect to FIG. 5b.

Figure 5B:
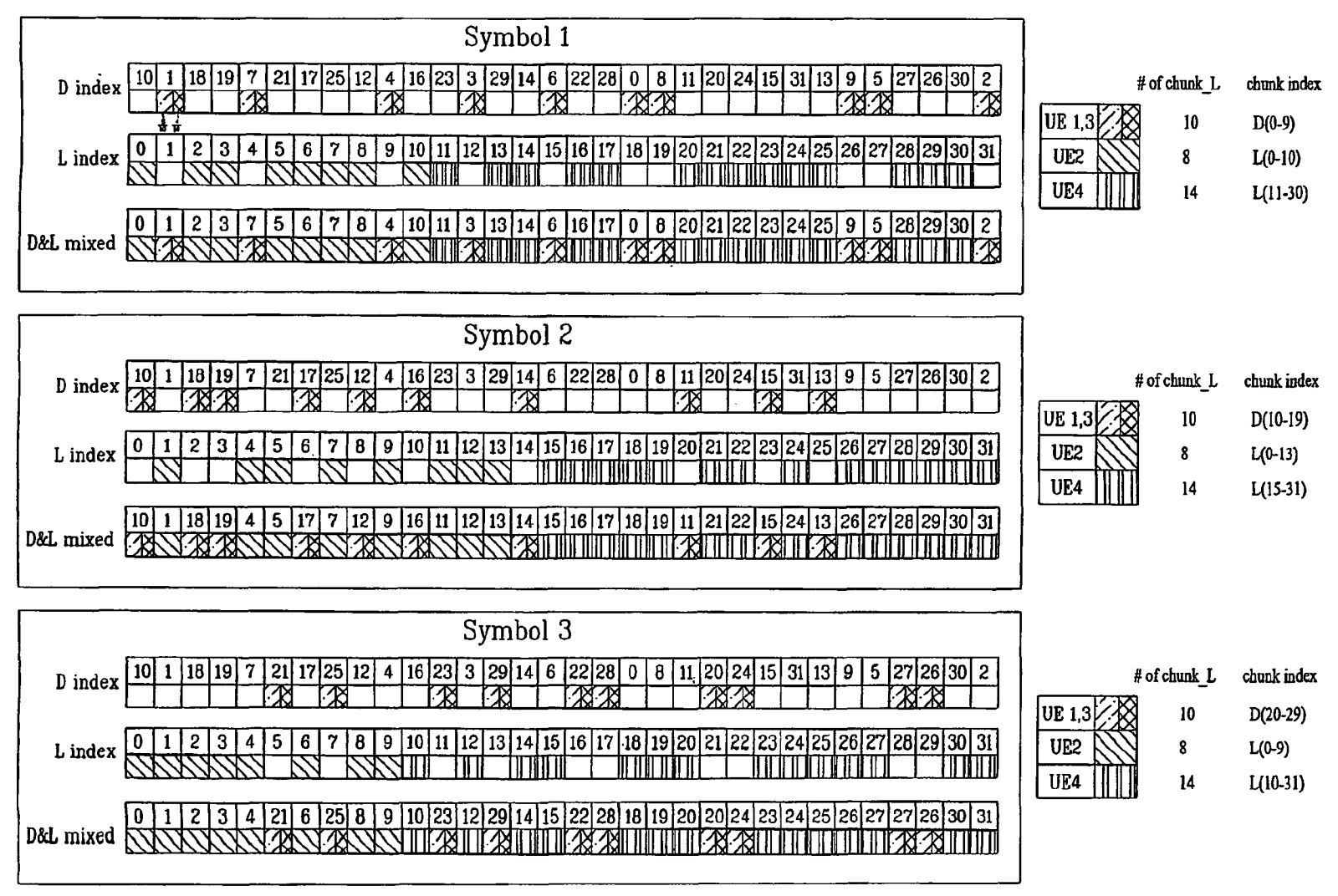

FIG. 5b illustrates frequency hopping at every symbol. In a first symbol, the resources (e.g., chunks) are allocated as same as that of FIG. 5a. In a second symbol, allocation of Chunk_Ls in D Index is different. That is, in the first symbol, index 0-index 10 of D Index were allocated to UE1 and UE3. However, in the second symbol, index 10-index 15 of D Index can be allocated to UE1 and UE3. In addition, allocation of Chunk_Ls of L Index can be implemented in a manner in which Chunk_Ls of L Index do not overlap with Chunk_Ls of D Index. Although each UE can be assigned a certain number of chunks, each UE is assigned different frequency resources from those of the first symbol.

In a third symbol, allocation of Chunk_Ls of D Index is different as well from the allocation of Chunk_Ls in the previous symbol (i.e., second symbol). That is, in the second symbol, index 10-index 19 were allocated to UE1 and UE3. However, in the third symbol, index 20-index 29 can be allocated to UE1 and UE3. In addition, allocation of Chunk_Ls of L Index can be implemented in a manner in which Chunk_Ls of L index do not overlap with Chunk_Ls of D Index. Although each UE can be assigned a certain number of chunks, each UE is assigned different frequency resources from those of the second symbol.

Embodiment #3

In embodiment #3 and embodiment #4, a method of allocating resources using localized chunks and distributed chunks according to the present invention will be explained. More specifically, the localized chunks and the distributed chunks are used in combination on specified OFDM symbols to realize communication. That is, the localized chunks and the distributed chunks are multiplexed.

In embodiment #3, more detailed explanation of the distributed chunk (i.e., Chunk_D) is presented. As discussed above, the localized chunks and the distributed chunks represent a plurality of subcarriers. In fact, there is no limit to a number of subcarriers that can be included in a chunk. Furthermore, the subcarriers included in the localized and distributed chunks can be in various forms. For example, the subcarriers in the localized chunk are consecutive to each other just as members of a group are connected. That is, if the subcarriers are indexed as integers (e.g., 0, 1, 2, 3 . . . ), a first localized chunk (i.e., Chunk_L1) can comprise subcarriers 0, 1, 2, 3, and a second localized chunk (i.e., Chunk_L2) can comprise subcarriers 4, 5, 6, 7. As explained here, the subcarriers in each localized chunk are consecutive or continuous.

Contrary to the localized chunk, the subcarriers of the distributed chunk are not connected consecutively but spread apart from each other. For example, a first distributed chunk (Chunk_D1) can comprise subcarriers 0, 4, 9, 14, and a second distributed chunk (Chunk_D2) can comprise subcarriers 2, 6, 11, 17. As explained here, the subcarriers in each distributed chunk are not provided consecutively, but rather, separated apart.

In the current embodiment, the distributed chunk and the localized chunk can be allocated to a specific user (i.e., UE), and at least one chunk is allocated to at least one user. For example, chunks 1, 2, and 3 can be allocated to UE1, and chunks 4, 5 can be allocated to UE2. Furthermore, a chunk can be allocated to more than one user or UE. That is, when data is broadcasted from the transmitting end, the specific chunk can be allocated to a plurality of UEs. For example, chunks 1 and 2 can be allocated to UE1 and UE2, respectively, and chunk 3 can be allocated to UE1 and UE2.

If the transmitting end and the receiving end are provided with the information of the subcarriers included in the chunk(s), the transmitting end can send an index of the specific chunk to the receiving end so that the receiving end can be provided with the subcarriers to be used. That is, if index information representing the allocated chunk of a specific receiving end is sent by the transmitting end, the specific receiving end can be notified of the subcarriers allocated to it using the index information. Accordingly, the transmitting end can efficiently transmit allocation information regarding the plurality of subcarriers using a small size signaling.

Figure 6:
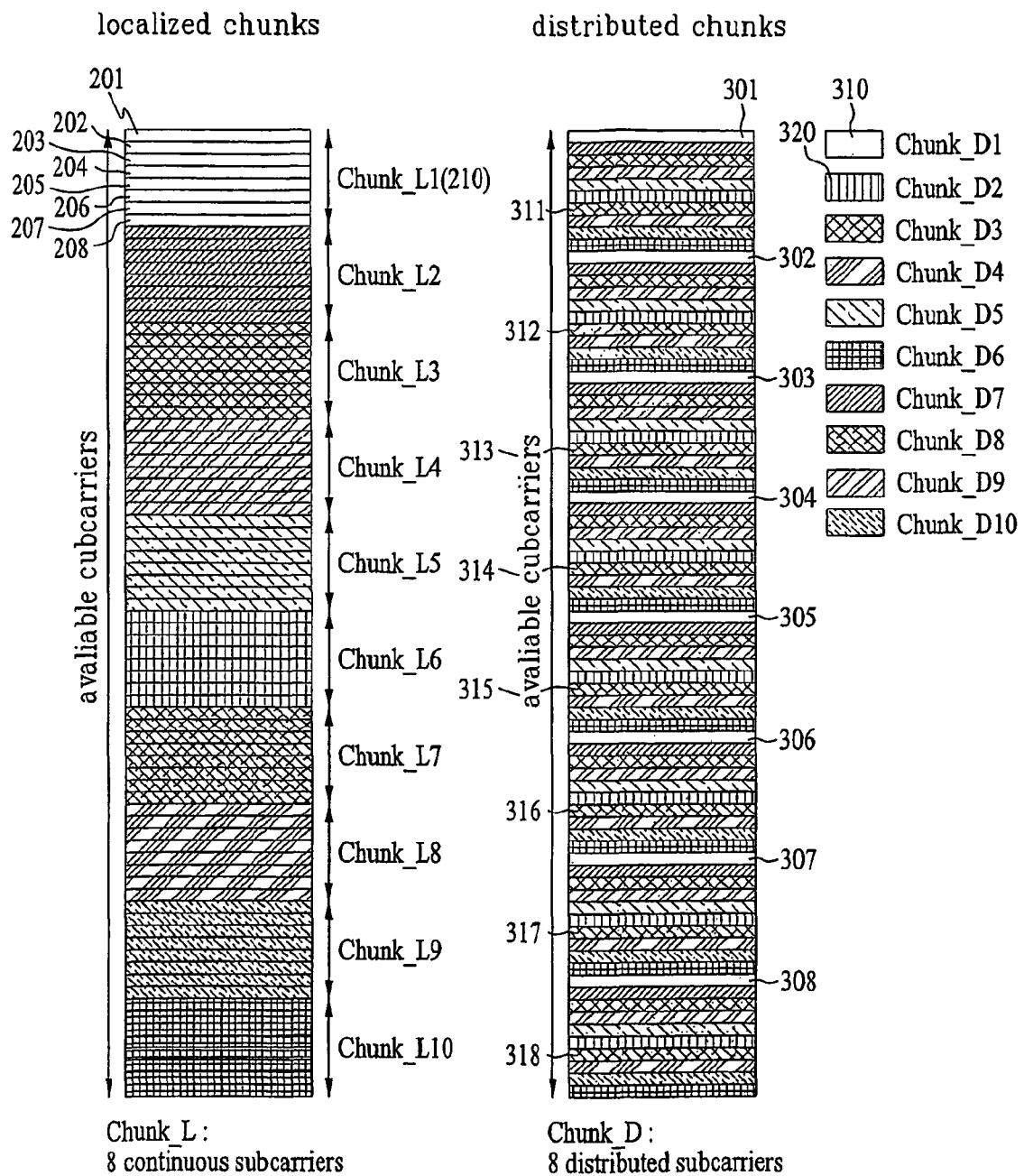
FIG. 6 illustrates the distributed chunks and the localized chunks according to embodiment #3 of the present invention.

FIG. 6 illustrates the distributed chunks (i.e., Chunk_Ds) and the localized chunks (i.e., Chunk_Ls) according to embodiment #3 of the present invention. Preferably, the subcarrier patterns included in Chunk_D and Chunk_L are determined based on a subcarrier allocation scheme (i.e., subcarrier distributed allocation scheme or subcarrier localized allocation scheme). For example, if the subcarriers are allocated to a user according to the subcarrier distributed allocation scheme, Chunk_D should be used. The subcarrier distributed allocation scheme allocates the subcarriers provided across the frequency domain to achieve frequency diversity gain. Alternatively, if the subcarriers are allocated according to the subcarrier localized allocation scheme, Chunk_L should be used. The subcarrier localized allocation scheme groups the subcarriers of nearby or neighboring frequency bands from the subcarriers provided across the frequency domain. Moreover, since the subcarrier localized allocation scheme allocates the frequency domain having good channel condition, signal-to-noise ratio (SINR) characteristics of each user can be improved to achieve user diversity. That is, since the channels for UE1 and UE2 are different, the qualities of data transmitted via a specific frequency domain for UE1 and UE2 are different as well. In such situations, UE1 should be allocated a chunk corresponding to continuous frequency domain which indicates good quality toward UE1, and UE2 should be allocated a chunk corresponding to continuous frequency domain which indicates good quality toward UE2 so as to achieve user diversity.

Referring to FIG. 6, the localized chunk is represented by Chunk_L1 210 which comprises subcarriers 201-208. That is, Chunk_L1 210 preferably includes neighboring subcarriers that are close or connected to each other (e.g., subcarriers 201-208). Alternatively, the distributed chunk includes Chunk_D1 310 which comprises subcarriers 301-308. Further, Chunk_D2 can comprise subcarriers 311-318. More specifically, Chunk_D1 and Chunk_D2 preferably comprise distributed (separated by specified intervals) subcarriers.

The following table (Table 1) shows a total of 80 subcarriers of FIG. 6 organized in terms of Chunk_L and Chunk_D.

TABLE 1

| Chunk L | Subcarrier Number | Chunk D | Subcarrier Number |
|---|---|---|---|
| 1 | 1, 2, 3, 4, 5, 6, 7, 8 | 1 | 1, 11, 21, 31, 41, 51, 61, 71 |
| 2 | 9, 10, 11, 12, 13, 14, 15, 16 | 2 | 7, 17, 27, 37, 47, 57, 67, 77 |
| 3 | 17, 18, 19, 20, 21, 22, 23, 24 | 3 | 3, 13, 23, 33, 43, 53, 63, 73 |
| 4 | 25, 26, 27, 28, 29, 30, 31, 32 | 4 | 9, 19, 29, 39, 49, 59, 69, 79 |
| 5 | 33, 34, 35, 36, 37, 38, 39, 40 | 5 | 5, 15, 25, 35, 45, 55, 65, 75 |
| 6 | 41, 42, 43, 44, 45, 46, 47, 48 | 6 | 2, 12, 22, 32, 42, 52, 62, 72 |
| 7 | 49, 50, 51, 52, 53, 54, 55, 56 | 7 | 8, 18, 28, 38, 48, 58, 68, 78 |
| 8 | 57, 58, 59, 60, 61, 62, 63, 64 | 8 | 4, 14, 24, 34, 44, 54, 64, 74 |
| 9 | 65, 66, 67, 68, 69, 70, 71, 72 | 9 | 10, 20, 30, 40, 50, 60, 70, 80 |
| 10 | 73, 74, 75, 76, 77, 78, 79, 80 | 10 | 6, 16, 26, 36, 46, 56, 66, 76 |

Figure 7:
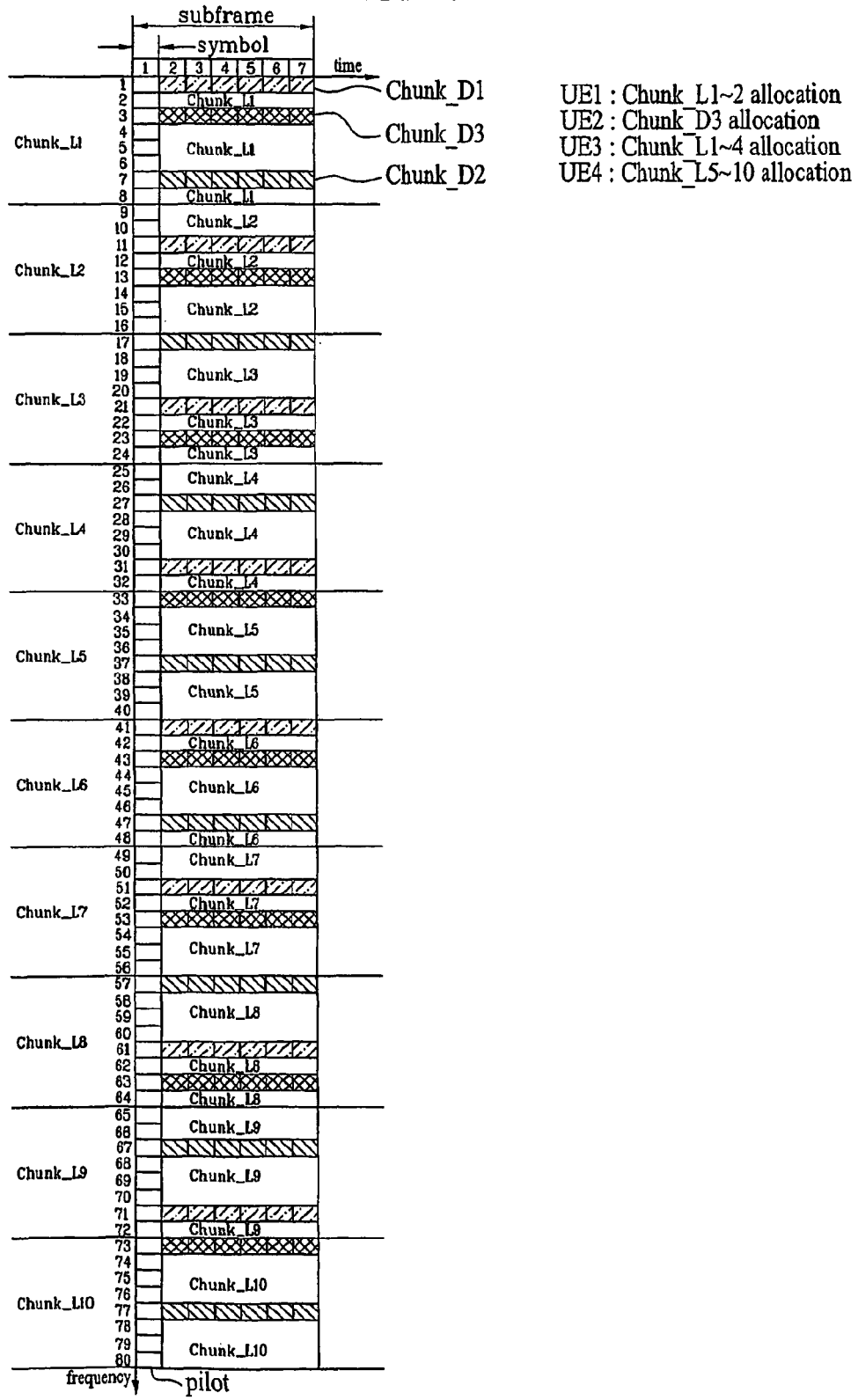
FIG. 7 illustrates combined localized and distributed chunks using a Frequency Division Multiplexing (FDM) scheme according to embodiment #3 of the present invention.

FIG. 7 illustrates combined localized and distributed chunks using a Frequency Division Multiplexing (FDM) scheme according to embodiment #3 of the present invention. As illustrated in FIG. 7, an OFDM subframe includes seven (7) OFDM symbols. The OFDM symbol included in the OFDM subframe can be transmitted on any one of 80 subcarriers as shown in Table 1.

A first OFDM symbol includes a pilot signal, and the pilot signal can use to signal value known by both the transmitting end and the receiving end to estimate and equalize channel(s). Since the OFDM symbol is not limited to a specific location/position, the pilot signal can be included in a second OFDM symbol, specified subcarriers from a plurality of subcarriers of the second OFDM symbol, or a plurality of OFDM symbols. In addition to being included in the pilot signal, the first OFDM symbol can be included in control information of the chunk or subcarriers located in the OFDM subframe.

In the example of FIG. 7, the localized chunks and the distributed chunks are multiplexed in one OFDM subframe. More specifically, the distributed chunks are allocated to a specific frequency domain (e.g., subcarriers), and the localized chunks are allocated to the rest of the frequency domain (e.g., subcarriers). Here, the localized chunks and the distributed chunks are multiplexed using a Frequency Division Multiplexing (FDM) scheme.

In attempt to further distribute or separate the subcarriers carrying the distributed chunks, the distributed chunks are first allocated, followed by the localized chunks. That is, with respect to the OFDM subframe of FIG. 7, if three (3) distributed chunks (i.e., Chunk_D1, Chunk_D2, and Chunk_D3) and 10 localized chunks (i.e., Chunk_L1-Chunk_L10) are allocated, allocation of the distributed chunks (i.e., Chunk_D1, Chunk_D2, and Chunk_D3) have priority over the localized chunks.

Based on priority, Chunk_D1 and Chunk_D2 are allocated to UE1 and Chunk_D3 is allocated to UE2. After allocation of the distributed chunks is completed, Chunk_L1-Chunk_L4 are allocated to UE3 and Chunk_L5-Chunk_L10 are allocated to UE4.

Since the distributed chunks are allocated first to UE1 and UE2, Chunk_-D1-Chunk_D3 can be allocated to any of eight (8) subcarriers represented in Table 1. Thereafter, since the localized chunks are allocated to UE3 and UE4 after the distributed chunks are first allocated to UE1 and UE2, Chunk_L1-Chunk_L10 are allocated to the subcarriers which have not been allocated to Chunk_D1-Chunk_D3. In other words, Chunk_L1-Chunk_L10 are allocated the remaining subcarriers from eight (8) subcarriers represented in Table 1, not allocated to the distributed chunks. In short, the subcarriers for the distributed chunks and the localized chunks do not overlap.

The relationship between the chunks and the subcarriers are shown in Table 2.

TABLE 2

| User | Chunks | Subcarrier Numbers |
|---|---|---|
| UE1 | Chunk_D1 | 1, 11, 21, 31, 41, 51, 61, 71 |
|  | Chunk_D2 | 6, 16, 26, 36, 46, 56, 66, 76 |
| UE2 | Chunk_D3 | 3, 13, 23, 33, 43, 53, 63, 73 |
| UE3 | Chunk_L1 | 2, 4, 5, 7, 8 |
|  | Chunk_L2 | 9, 10, 12, 14, 15, |
|  | Chunk_L3 | 17, 18, 19, 20, 22, 24 |
|  | Chunk_L4 | 25, 27, 28, 29, 30, 32 |
| UE4 | Chunk_L5 | 34, 35, 37, 38, 39, 40 |
|  | Chunk_L6 | 42, 44, 45, 47, 48 |
|  | Chunk_L7 | 49, 50, 52, 54, 55, |
|  | Chunk_L8 | 57, 58, 59, 60, 62, 64 |
|  | Chunk_L9 | 65, 67, 68, 69, 70, 72 |
|  | Chunk_L10 | 74, 75, 77, 78, 79, 80 |

According to the embodiment of FIG. 7, the chunks are allocated in increments of a subframe. However, the present invention is not limited to the embodiment of FIG. 7 but can also be applied to other embodiments such as allocating the resources in intervals of a fine comprising at least one OFDM symbol. Furthermore, although the distributed chunks are allocated in equal intervals in the current embodiment, and the embodiment does not have to be limiting in such manner. Therefore, the distributed chunks can be allocated in non-equal intervals. For example, although Chunk_D1 includes subcarriers 1, 11, 21, 31, 41, 51, 61, and 71, Chunk_D1 can also include not-equally distributed subcarriers 1, 5, 7, 31, 41, 51, 61, and 65.

In embodiment #3, a frequency hopping scheme can also be applied. The detailed application of the frequency hopping scheme is provided hereafter.

When the distributed chunks are allocated, the frequency hopping scheme can be additionally used to reduce interference from neighboring cells and increase frequency diversity gain. The frequency hopping scheme replaces at certain specified number of OFDM symbols the subcarriers included in the distributed chunk according to a specific hopping pattern. Preferably, the configuration of subcarriers included in the distributed chunks is replaced at every OFDM symbol.

Provided below is an example of the frequency hopping scheme, in which a logical chunk is allocated to a user, and a physical chunk corresponding to the logical chunk is configured. Further, the logical channel replaces or exchanges the physical chunk while maintaining its status. Hereafter, the logical channel will be expressed as 'Chunk_DL' and the physical channel will be expressed as 'Chunk_DP.'

For example, since Chunk_D3 is allocated to UE2 in FIG. 7, a logical chunk (i.e., Chunk_DL3) is allocated to UE2, and the logical channel corresponds to a physical chunk (i.e., Chunk_DP3).

In Table 3 as provided below shows the changes in the corresponding relationship between the logical chunk and the physical chunk.

TABLE 3

| Index of Logical Chunk D (Chunk_DL) | Index of Physical Chunk D (Chunk_DP) | | | | | | |
|---|---|---|---|---|---|---|---|
| | Symbol 1 | Symbol 2 | Symbol 3 | Symbol 4 | Symbol 5 | Symbol 6 | Symbol 7 |
| 1 | 1 | 2 | 3 | 4 | 5 | 6 | 7 |
| 2 | 2 | 3 | 4 | 5 | 6 | 7 | 8 |
| 3 | 3 | 4 | 5 | 6 | 7 | 8 | 9 |

TABLE 3-continued

| Index of Logical Chunk D (Chunk_DL) | Index of Physical Chunk D (Chunk_DP) | | | | | | |
|---|---|---|---|---|---|---|---|
| | Symbol 1 | Symbol 2 | Symbol 3 | Symbol 4 | Symbol 5 | Symbol 6 | Symbol 7 |
| 4 | 4 | 5 | 6 | 7 | 8 | 9 | 10 |
| ... | ... | ... | ... | ... | ... | ... | ... |
| 10 | 10 | 1 | 2 | 3 | 4 | 5 | 6 |

For example, the user to which Chunk_DL1 is allocated can receive the subcarriers of Chunk_DP1 during a first OFDM symbol (i.e., Symbol 1), the subcarriers of Chunk_DP2 during a second OFDM symbol (i.e., Symbol 2), and the subcarriers of Chunk_DP3 during a third OFDM symbol (i.e., Symbol 3). That is, because a logical chunk remains fixed while a mapping (allocation) relationship between the logical chunk and the physical chunk changes, the frequency for a specific user also changes continuously. The present embodiment and other embodiments in the present invention are not limited to this example with respect to Table 3, but can be extended to Chunk_DP having different variations of cyclic shifts. That is, according to Table 3, the frequency hopping is based on a single cyclic shift. However, the frequency hopping can be based on cyclic shifts of 2 or 3, for example. Alternatively, the frequency hopping can be based on a predetermined pattern.

The following table, Table 4, shows an example of subcarriers included in a physical chunk.

TABLE 4

| Physical Chunk D | Subcarriers |
|---|---|
| Chunk_DP1 | 1, 11, 21, 31, 41, 51, 61, 71 |
| Chunk_DP2 | 7, 17, 27, 37, 47, 57, 67, 77 |
| Chunk_DP3 | 3, 13, 23, 33, 43, 53, 63, 73 |
| Chunk_DP4 | 9, 19, 29, 39, 49, 59, 69, 79 |
| Chunk_DP5 | 5, 15, 25, 35, 45, 55, 65, 75 |
| Chunk_DP6 | 2, 12, 22, 32, 42, 52, 62, 72 |
| Chunk_DP7 | 8, 18, 28, 38, 48, 58, 68, 78 |
| Chunk_DP8 | 4, 14, 24, 34, 44, 54, 64, 74 |
| Chunk_DP9 | 10, 20, 30, 40, 50, 60, 70, 80 |
| Chunk_DP10 | 6, 16, 26, 36, 46, 56, 66, 76 |

Table 5 represents the result of executing the frequency hopping scheme using Table 3 and Table 4. With respect to embodiment #3, since the distributed chunks are first allocated followed by the localized chunks, the remaining subcarriers, which refer to the subcarriers not changed or replaced by the frequency hopping scheme, are included in the localized chunks.

TABLE 5

| User | Logical Chunk | Symbol 1 Subcarrier | Symbol 2 Subcarrier | ... | Symbol 7 Subcarrier |
|---|---|---|---|---|---|
| UE1 | Chunk_DL1 | Chunk_DP1<br>1, 11, 21, 31, 41, 51, 61, 71 | Chunk_DP2<br>7, 17, 27, 37, 47, 57, 67, 77 | ... | Chunk_DP7<br>8, 18, 28, 38, 48, 58, 68, 78 |
| | Chunk_DL2 | Chunk_DP2<br>7, 17, 27, 37, 47, 57, 67, 77 | Chunk_DP3<br>3, 13, 23, 33, 43, 53, 63, 73 | ... | Chunk_DP8<br>4, 14, 24, 34, 44, 54, 64, 74 |
| UE2 | Chunk_DL3 | Chunk_DP3<br>3, 13, 23, 33, 43, 53, 63, 73 | Chunk_DP4<br>9, 19, 29, 39, 49, 59, 69, 79 | ... | Chunk_DP9<br>10, 20, 30, 40, 50, 60, 70, 80 |
| UE3 | Chunk_L1 | 2, 4, 5, 6, 8 | 1, 2, 4, 5, 6, 8 | ... | 1, 2, 3, 4, 5, 6, 7, 8 |
| | Chunk_L2 | 9, 10, 12, 14, 15, 16 | 10, 11, 12, 14, 15, 16 | ... | 9, 11, 12, 13, 15, 16 |
| | Chunk_L3 | 18, 19, 20, 22, 24 | 18, 20, 21, 22, 24 | ... | 17, 19, 21, 22, 23, |
| | Chunk_L4 | 25, 26, 28, 29, 30, 32 | 25, 26, 28, 30, 31, 32 | ... | 25, 26, 27, 29, 31, 32 |

TABLE 5-continued

| User | Logical Chunk | Symbol 1 Subcarrier | Symbol 2 Subcarrier | ... | Symbol 7 Subcarrier |
|---|---|---|---|---|---|
| UE4 | Chunk_L5 | 34, 35, 36, 38, 39, 40 | 34, 35, 36, 38, 40 | ... | 33, 35, 36, 37, 39, |
| | Chunk_L6 | 42, 44, 45, 46, 48 | 41, 42, 44, 45, 46, 48 | ... | 41, 42, 43, 44, 45, 46, 47, |
| | Chunk_L7 | 49, 50, 52, 54, 55, 56 | 50, 51, 52, 54, 55, 56 | ... | 49, 51, 52, 53, 55, 56 |
| | Chunk_L8 | 58, 59, 60, 62, 64 | 58, 60, 61, 62, 64 | ... | 57, 59, 61, 62, 63, |
| | Chunk_L9 | 65, 66, 68, 69, 70, 72 | 65, 66, 68, 70, 71, 72 | ... | 65, 66, 67, 69, 71, 72 |
| | Chunk_L10 | 74, 75, 76, 78, 79, 80 | 74, 75, 76, 78, 80 | ... | 73, 75, 76, 77, 79, |

Preferably, the subcarriers included in Chunk_D of FIG. 7 are distributed between chunks having of index represented consecutively or continuously. That is, first, Chunk_D1 includes subcarriers numbered 1, 11, 21, 31, 41, 51, 61, and 71. Chunk_D2 includes eight (8) subcarriers numbered 7, 17, 27, 37, 47, 57, 67, and 77. Here, the represented numbers (subcarriers) of the index of each Chunk_D1 and Chunk_D2 are continuous or consecutive. However, the subcarriers included in Chunk_D of the index are not consecutive or apart from each other.

Generally, in order to reduce control information in transmission to the receiving end, a chunk having a continuous index is allocated to a receiving end. For example, a chunk representing indices of 1, 2, 3, 4, 5, and 6 are allocated instead of a chunk representing indices of 1, 6, 7, 10, 13, and 14 to a receiving end. The advantage of allocating a chunk having consecutively numbered indices is that information regarding the indices can be reduced or simplified. Here, since the subcarriers included in Chunk_D which received the consecutive index are not close to each other, the chunk can included subcarriers that are even more distributed.

As another example, the indices are not continuous (or non-consecutive) in order for Chunk_D to include the distributed subcarriers that are separated by specified intervals. For example, assuming that the components of FIG. 7 are rearranged, Chunk_D1 including Index 1 which can include the subcarriers numbered 1, 5, 9, 13, 17, and 21, Chunk_D2 including Index 2 which can include the subcarriers numbered 2, 6, 10, 14, 18, and 22, and Chunk_D6 including Index 6 which can include the subcarriers numbered 27, 31, 35, 39, 43, and 47. Here, if two (2) chunks are allocated to a first receiving end, Chunk_D1 and Chunk_D2 are not automatically allocated. Rather, the subcarriers included in each chunk should be considered prior to allocating the indices. In other words, different combinations can be allocated, such as Chunk_D1 and Chunk_D6 or Chunk_D2 and Chunk_D6. Although the information related to each index increases, the allocation of the subcarriers to each chunk can be simplified.

Embodiment #4

In embodiment #4 of the present invention, the distributed chunks and the localized chunks are allocated together. That is, the distributed chunks and the localized chunks are multiplexed. According to embodiment #4, each localized chunk includes an equal number of subcarriers.

Figure 8:
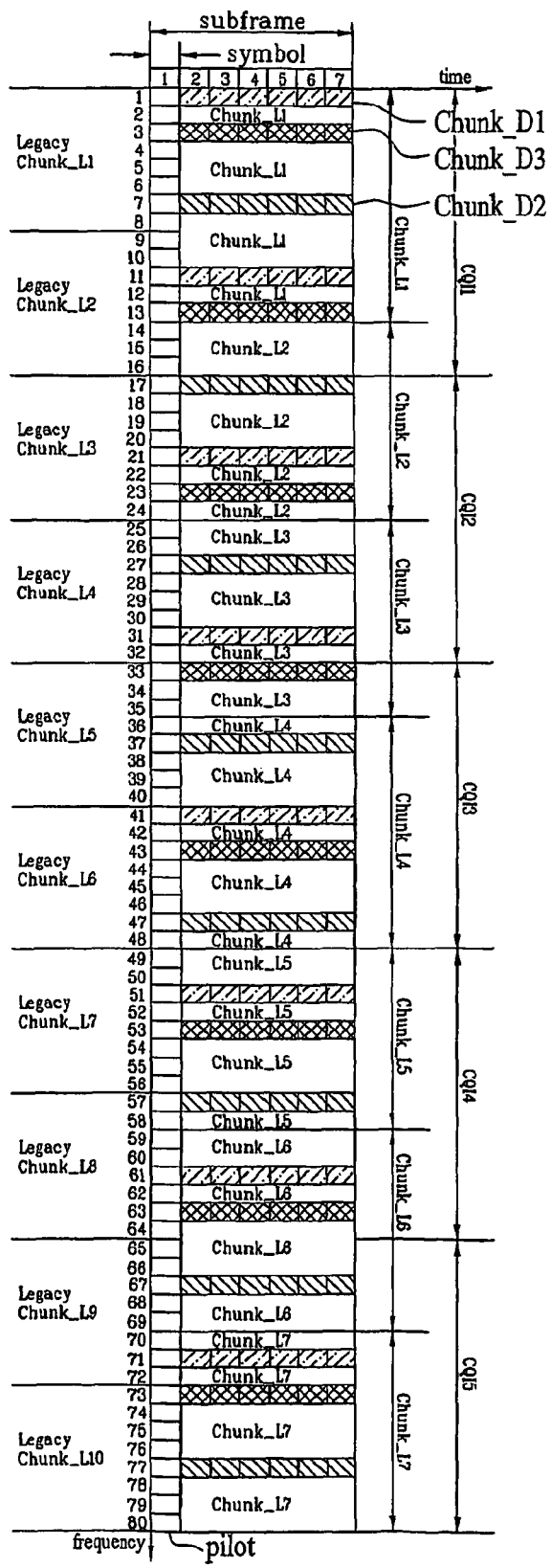
FIG. 8 illustrates a method of multiplexing the distributed chunks and the localized chunks according to embodiment #4 of the present invention.

FIG. 8 illustrates a method of multiplexing the distributed chunks and the localized chunks according to embodiment #4 of the present invention. FIG. 8 and FIG. 7 illustrate different characteristics. Referring to FIG. 7, since the distributed chunks are first allocated, the distributed chunks include a certain number of subcarriers. However, the localized chunks are allocated the remaining subcarriers which do not overlap with the subcarriers of the distributed chunks. As such, a number of subcarriers included in the localized chunks can vary and are not necessarily fixed. For example, referring to FIG. 7, Chunk_L1 has five (5) subcarriers, Chunk_L2 has six (6) subcarriers, Chunk_L3 has five (5) subcarriers, Chunk_L4 has six (6) subcarriers, Chunk_L5 has six (6) subcarriers, Chunk_L6 has five (5) subcarriers, Chunk_L7 has six (6) subcarriers, Chunk_L8 has five (5) subcarriers, Chunk_L9 has six (6) subcarriers, and Chunk_L10 has six (6) subcarriers. As illustrated here, each chunk includes different number of subcarriers, and therefore, a number of data symbols for transmitting each chunk are also different. On the contrary, the embodiment of FIG. 8 introduces the localized chunks having same number subcarriers in each chunk. Since 'Legacy Chunk_L' of FIG. 8 refers to Chunk_L of FIG. 7, Legacy Chunk_L and Chunk_L of FIG. 8 can be compared to determine the characteristics of the embodiment as illustrate in FIG. 8.

Referring to FIG. 8, each localized chunk includes a fixed number of subcarriers. Even though the number of subcarriers of Chunk_L and Chunk_D are same in FIG. 8, the number of the subcarriers of Chunk_L and Chunk_D can also be different.

The transmitting end can the number of subcarriers for Chunk_D and Chunk_L based on various information such as channel quality, change in channel condition, and status of a mobile station. In FIG. 8, three (3) distributed chunks (Chunk_D1-Chunk_D3) are allocated, and the distributed chunks include eight (8) subcarriers. More specifically, first, Chunk_D1 and Chunk_D2 are allocated to UE1, and Chunk_D3 is allocated to UE2. After the distributed chunks are allocated, Chunk_L1-Chunk_L4 are allocated to UE3, and Chunk_L5-Chunk_L10 are allocated to UE4. To reiterate, in the present embodiment, the distributed chunks (Chunk_D1-Chunk_D3) are first allocated. Here, Chunk_D1 is allocated thereto subcarriers numbered 1, 11, 21, 31, 41, 51, 61, and 71. Further, Chunk_D2 is allocated thereto subcarriers numbered 7, 17, 27, 37, 47, 57, 67, and 77. Moreover, Chunk_D3 is allocated thereto subcarrier numbered 3, 13, 23, 33, 43, 53, 63, and 73.

After the distributed chunks are allocated, the transmitting end begins the allocation process of the localized chunks. Through allocation of the distributed chunks, 24 subcarriers have been allocated, leaving 56 subcarriers to be allocated to the localized chunks. In allocating the subcarriers to the localized chunks, a preferred number of subcarriers to be allocated to a chunk should be first determined. Based on the preferred number, the remaining 56 subcarriers should be allocated to the localized chunks.

If eight (8) subcarriers are determined to be allocated to each localized chunk, then there would be seven (7) localized chunks (Chunk_L1-Chunk_L7). As mentioned above, since the subcarriers to be allocated to the localized chunks are close to each other and/or consecutive, Chunk_L1 is allocated subcarriers numbered 1-13, excluding the subcarriers numbered 1, 3, 7, 11, and 13 since these subcarriers have already been allocated to the distributed chunks. Therefore, the subcarriers numbered 2, 4, 5, 6, 8, 9, 10, and 12 are allocated to Chunk_L1. Similarly, Chunk_L2 is allocated subcarriers numbered 14-24, except subcarriers numbered 17, 21, and 23 are excluded for they have already been allocated to the distributed chunks. Therefore, the subcarriers numbered 14, 15, 16, 18, 19, 20, 22, and 24 are allocated to Chunk_L2. Here, the remaining localized chunks (e.g., Chunk_L3-Chunk_L7) can be allocated in a similar manner.

Embodiment #4 has following advantages. First, the distributed chunks are allocated first, and therefore, the distributed chunks are amply distributed. Second, since the subcarriers allocated to the localized chunks can carry fixed number of data symbols, the transmitting can more efficiently perform scheduling.

As discussed above, the localized chunks (i.e., Chunk_L1-Chunk_L7) are allocated thereto the remaining subcarriers, and the subcarriers are allocated consecutively (and/or close to each other). In the embodiment of above, each of the distributed chunks and the localized chunks include eight (8) subcarriers. However, the number of the distributed chunks and the localized chunks can be same or different. For example, eight (8) subcarriers can be allocated to each distributed chunk while seven (7) subcarriers can be allocated to each localized chunk.

In embodiment #4, a frequency hopping scheme can also be applied. The detailed application of the frequency hopping scheme is provided hereafter.

When the distributed chunks are allocated, the frequency hopping scheme can be additionally used to reduce interference from neighboring cells and increase frequency diversity gain. The frequency hopping scheme replaces the subcarriers, which are included in the distributed chunk in specified number of OFDM symbols, according to a specific hopping pattern. Preferably, the subcarriers included in the distributed chunks can be replaced at every OFDM symbol.

Provided below is an example of the frequency hopping scheme, in which a specific logical chunk is allocated to a user, and a physical chunk corresponding to the logical chunk is configured. Further, the logical channel replaces or exchanges the physical chunk while maintaining its status. Hereafter, the logical channel can be expressed as 'Chunk_DL' and the physical channel can be expressed as 'Chunk_DP.'

For example, since Chunk_D3 is allocated to UE2 in FIG. 8, a logical chunk (i.e., Chunk_DL3) is allocated to UE2, and the logical channel corresponds to a physical chunk (i.e., Chunk_DP3).

In Table 6 as provided below shows the changes in the corresponding relationship between the logical chunk and the physical chunk.

TABLE 6

| Index of Logical Chunk D (Chunk_DL) | Index of Physical Chunk D (Chunk_DP) | | | | | | |
|---|---|---|---|---|---|---|---|
| | Symbol 1 | Symbol 2 | Symbol 3 | Symbol 4 | Symbol 5 | Symbol 6 | Symbol 7 |
| 1 | 1 | 2 | 3 | 4 | 5 | 6 | 7 |
| 2 | 2 | 3 | 4 | 5 | 6 | 7 | 8 |
| 3 | 3 | 4 | 5 | 6 | 7 | 8 | 9 |
| 4 | 4 | 5 | 6 | 7 | 8 | 9 | 10 |
| ... | ... | ... | ... | ... | ... | ... | ... |
| 10 | 10 | 1 | 2 | 3 | 4 | 5 | 6 |

For example, the user to which Chunk_DL1 is allocated can receive the subcarriers of Chunk_DP1 during a first OFDM symbol (i.e., Symbol 1), the subcarriers of Chunk_DP2 during a second OFDM symbol (i.e., Symbol 2), and the subcarriers of Chunk_DP3 during a third OFDM symbol (i.e., Symbol 3). That is, because a logical chunk remains fixed while a mapping (allocation) relationship between the logical chunk and the physical chunk changes, the frequency for a specific user also changes continuously.

The following table, Table 7, shows an example of subcarriers included in a physical chunk.

TABLE 7

| Physical Chunk D | Subcarriers |
|---|---|
| Chunk_DP1 | 1, 11, 21, 31, 41, 51, 61, 71 |
| Chunk_DP2 | 7, 17, 27, 37, 47, 57, 67, 77 |
| Chunk_DP3 | 3, 13, 23, 33, 43, 53, 63, 73 |
| Chunk_DP4 | 9, 19, 29, 39, 49, 59, 69, 79 |
| Chunk_DP5 | 5, 15, 25, 35, 45, 55, 65, 75 |
| Chunk_DP6 | 2, 12, 22, 32, 42, 52, 62, 72 |
| Chunk_DP7 | 8, 18, 28, 38, 48, 58, 68, 78 |
| Chunk_DP8 | 4, 14, 24, 34, 44, 54, 64, 74 |
| Chunk_DP9 | 10, 20, 30, 40, 50, 60, 70, 80 |
| Chunk_DP10 | 6, 16, 26, 36, 46, 56, 66, 76 |

Table 8 represents the result of executing the frequency hopping scheme using Table 6 and Table 7. With respect to embodiment #3, since the distributed chunks are first allocated followed by the localized chunks, the remaining subcarriers, which refer to the subcarriers not changed or replaced by the frequency hopping scheme, are included in the localized chunks.

TABLE 8

| User | Logical Chunk | Symbol 1 Subcarrier | Symbol 2 Subcarrier | ... | Symbol 7 Subcarrier |
|---|---|---|---|---|---|
| UE1 | Chunk_DL1 | Chunk_DP1<br>1, 11, 21, 31, 41, 51, 61, 71 | Chunk_DP2<br>7, 17, 27, 37, 47, 57, 67, 77 | ... | Chunk_DP7<br>8, 18, 28, 38, 48, 58, 68, 78 |
| | Chunk_DL2 | Chunk_DP2<br>7, 17, 27, 37, 47, 57, 67, 77 | Chunk_DP3<br>3, 13, 23, 33, 43, 53, 63, 73 | ... | Chunk_DP8<br>4, 14, 24, 34, 44, 54, 64, 74 |
| UE2 | Chunk_DL3 | Chunk_DP3<br>3, 13, 23, 33, 43, 53, 63, 73 | Chunk_DP4<br>9, 19, 29, 39, 49, 59, 69, 79 | ... | Chunk_DP9<br>10, 20, 30, 40, 50, 60, 70, 80 |
| UE3 | Chunk_L1 | 2, 4, 5, 6, 8, 9, 10, 12 | 1, 2, 4, 5, 6, 8, 10, 11 | ... | 1, 2, 3, 5, 6, 7, 9, 11 |
| | Chunk_L2 | 14, 15, 16, 18, 19, 20, 22, 24 | 12, 14, 15, 16, 18, 20, 21, 22 | ... | 12, 13, 15, 16, 17, 19, 21, 22 |
| | Chunk_L3 | 25, 26, 28, 29, 30, 32, 34, 35 | 24, 25, 26, 28, 30, 31, 32, 34 | ... | 23, 25, 26, 27, 29, 31, 32, 33 |

TABLE 8-continued

| User | Logical Chunk | Symbol 1 Subcarrier | Symbol 2 Subcarrier | ... | Symbol 7 Subcarrier |
|---|---|---|---|---|---|
|  | Chunk_L4 | 36, 38, 39, 40, 42, 44, 45, 46 | 35, 36, 38, 40, 41, 42, 44, 45 | ... | 35, 36, 37, 39, 41, 42, 43, 45 |
| UE4 | Chunk_L5 | 48, 49, 50, 52, 54, 55, 56, 58 | 46, 48, 50, 51, 52, 54, 55, 56 | ... | 46, 47, 49, 51, 52, 53, 55, 56 |
|  | Chunk_L6 | 59, 60, 62, 64, 65, 66, 68, 69 | 58, 60, 61, 62, 64, 65, 66, 68 | ... | 57, 59, 61, 62, 63, 65, 66, 67 |
|  | Chunk_L7 | 70, 72, 74, 75, 76, 78, 79, 80 | 70, 71, 72, 74, 75, 76, 78, 80 | ... | 69, 71, 72, 73, 75, 76, 77, 79 |

Preferably, the subcarriers included in Chunk_D of FIG. 8 are distributed between chunks having of index represented consecutively or continuously. That is, first, Chunk_D1 includes subcarriers numbered 1, 11, 21, 31, 41, 51, 61, and 71. Chunk_D2 includes eight (8) subcarriers numbered 7, 17, 27, 37, 47, 57, 67, and 77. Here, the represented numbers (subcarriers) of the index of each Chunk_D1 and Chunk_D2 are continuous or consecutive. However, the subcarriers included in Chunk_D of the index are not close to each other.

Generally, in order to reduce control information in transmission to the receiving end, a chunk having a continuous index is allocated to a receiving end. For example, a chunk representing indices of 1, 2, 3, 4, 5, and 6 are allocated instead of a chunk representing indices of 1, 6, 7, 10, 13, and 14 to a receiving end. The advantage of allocating a chunk having consecutively numbered indices is that information regarding the indices can be reduced or simplified. Here, since the subcarriers included in Chunk_D which received the consecutive indices are not close to each other, the chunk can included subcarriers that are even more distributed.

As another example, the indices are not continuous in order for Chunk_D to include the subcarriers that are distributed. For example, Chunk_D1 having Index 1 which can include the subcarriers numbered 1, 5, 9, 13, 17, and 21, Chunk_D2 having Index 2 which can include the subcarriers numbered 2, 6, 10, 14, 18, and 22, and Chunk_D6 having Index 6 which can include the subcarriers numbered 27, 31, 35, 39, 43, and 47. Here, if two (2) chunks are allocated to a first receiving end, Chunk_D1 and Chunk_D2 are not automatically allocated. Rather, the subcarriers included in each chunk should be considered prior to allocating the indices. In other words, different combinations can be allocated, such as Chunk_D1 and Chunk_D6 or Chunk_D2 and Chunk_D6. Evidently, although the information of each index increases, the allocation of the subcarriers to each chunk can be simplified.

The transmitting end can use a Channel Quality Information (CQI) fedback from the receiving end to determine the subcarriers allocated to the localized chunks. For example, in case of FIG. 8, five (5) CQIs are received by the transmitting end. The received five (5) CQI can be independently transmitted from the receiving end, and these CQIs can be used to determine which channel quality of the bands. Moreover, the transmitting end can use the CQI to allocate the localized chunk which has the best channel condition, and through this, user diversity can be achieved.

If the frequency band indicated by the CQI is fixed, then different CQIs can overlap with each other in a localized chunk. That is, CQI 1 of FIG. 8 represents the channel qualities of the frequency bands corresponding to the subcarriers numbered 1-16, and CQI 2 represents the channel qualities of the frequency bands corresponding to the subcarriers numbered 17-32. However, if the receiving end sends feedback information indicating that the channel qualities of CQI 1 is good but the channel qualities of CQI 2 is poor, it can be difficult to determine whether the channel quality corresponding to the frequency band for carrying Chunk_L2, which corresponds to CQI 2, can be considered to be good. In this situation, the transmitting end can allocate Chunk_L2 to a specific receiving end based on CQI 2 information since the Chunk_L2 includes more of the frequency bands of CQI 2. Furthermore, the transmitting end can allocate Chunk_L2 to a specific receiving end according to an average value derived from adding weight values in amount of number of subcarriers, where the subcarriers are included in the corresponding CQI.

Embodiment #5

An embodiment #5 of the present invention introduces a resource allocation method of using any embodiments #1-#4. Embodiments #1-#4 can be applied in any combination according to the communication condition and/or other conditions. More specifically, it is preferable that the transition or conversion between the embodiments is performed according to a specified condition. In detail, for example, while executing embodiment #1 or embodiment #2, if it is determined that performing embodiment #3 or embodiment #4 would be more advantageous based on the specified condition being satisfied, embodiment #3 or embodiment #4 can be used to allocate the wireless resources.

In embodiment #1 and embodiment #2, the composition of the chunks is simple since only the localized chunks are used for allocation. However, if the number of the localized chunks allocated by the distributed allocation scheme are small, it is difficult to achieve sufficient frequency diversity gain.

In embodiment #3 and embodiment #4, the composition of the chunks is more complex since both the localized chunks and the distributed chunks are used for allocation. However, since the distributed chunk by itself can generate frequency diversity, it is possible to achieve sufficient frequency diversity gain with a small number of the distributed chunks.

For example, assume that the wireless resources (i.e., subcarriers) are allocated according to embodiment #1. In this case, it is preferable to determine changing from the current embodiment to a different embodiment based on the users (e.g., UE) which are allocated the localized chunks according to the distributed allocation scheme. More specifically, preferably, the UE can change from the current embodiment (i.e., embodiment #1), in which the localized chunks are allocated according to the distributed allocation scheme, to a different embodiment (e.g., embodiment 3 or embodiment 4) if a number of the allocated localized chunks fall below a specified threshold level.

For example, Chunk_L1 and Chunk_L2 are allocated to UE1 according to the distributed allocation scheme of embodiment #1, Chunk_L3-Chunk_L5 are allocated to UE2, and Chunk_L6-Chunk_L9 are allocated to UE3. Here, the number of the localized chunks allocated to UE1 is compared to the specified threshold level. The reason for comparing UE1 as opposed to the other UEs is that UE1 has the least number of the allocated localized chunks. If the number of the localized chunks of UE1 is below the specified threshold value, then UE1 can change to either embodiment #3 or embodiment #4.

Alternatively, the number of allocated localized chunks for a user having the most number of allocated localized chunks can be compared. Continuing from the above example, since UE3 has the most number of the allocated localized chunks, this number is compared to the specified threshold value. If this number is below the specified threshold value, then UE3 can change to either embodiment #3 or embodiment #4.

As another alternative, a total number or an average number of the allocated localized chunks to UE1, UE2, and UE3 can be compared to the specified threshold value as well. Similarly, if the total number or the average number falls below the specified threshold value, then UE3 can change to either embodiment #3 or embodiment #4.

In another example, the localized chunks, allocated according to the distributed allocation scheme of embodiment #2, are shared by multiple UEs. Furthermore, the number of the localized chunks allocated to each UE according to the distributed allocation scheme is equal to the number of the localized chunks allocated by the distributed allocation scheme. In addition, the number of the localized chunks allocated by the distribute allocation scheme are compared to a specified threshold value, and if the number of the localized chunks falls below the specified threshold level, the UE can change to either embodiment #3 or embodiment #4.

Embodiment #6

An embodiment #6 of the present invention relates to transmitting information related to wireless resources by a receiving end (e.g., UE). More specifically, when the resources (e.g., subcarriers) are allocated, a transmission method of control information related to resource allocation changes. As such, embodiment #6 introduces a more efficient method for transmitting the control information related to resource allocation.

The transmitting end (e.g., base station) equipped with scheduling function sends resource allocation information to the receiving end. In the resource allocation information transmission method according to embodiment #6, the control information can include which chunk type (i.e., Chunk_L or Chunk_D) is allocated to the receiving end or which chunk allocation scheme (i.e., distributed allocation scheme or localized allocation scheme) is allocated to the receiving end.

Provided below is a method of transmitting control information according to embodiment #6 when the transmitting end allocates the localized chunks only. The transmitting end can transmit an indicator (i.e., Indicator_D or Indicator_L) to indicate which chunk type (i.e., Chunk_L or Chunk_D) is allocated to a specific UE. For example, Indicator_D is transmitted to UE1 to indicate that the localized chunks allocated according to the distributed allocation scheme are allocated. Here, information only on the localized chunks allocated to UE1 can also be transmitted. Preferably, the indicator is represented in one (1) bit. Furthermore, the transmitting end can transmit Indicator_L, which indicates the localized chunks allocated to UE2 according to the localized allocation scheme, and information on the localized chunks allocated to all UEs according to the distribute allocation scheme, and information related to the localized chunks allocated to UE2, preferably.

The localized chunks allocated according to the distribute allocation scheme have priority in terms of order of allocation compared to the localized chunks allocated according to the localized allocation scheme. In other words, the localized chunks allocated according to the distributed allocation scheme are allocated prior to the localized chunks allocated according to the localized allocation scheme. Furthermore, if UE1 has the information related to the first allocated localized chunks for UE1, information related to resource allocation can be accurately determined. From receiving Indicator_D, UE1 knows that the localized chunks according to the distributed allocation scheme are to be allocated to it.

Although the localized chunks are not allocated to UE2, UE2 has to have information related to the allocated distributed chunks. If UE2 only has the information on the localized chunks for UE2, there can be a conflict between the localized chunks allocated according to the distributed allocation scheme and the wireless resources (e.g., subcarriers) of the localized chunks for UE2. Furthermore, UE2 receives information on the localized chunks for UE2 and information on the localized chunks allocated to all UEs according to the distributed allocation scheme. Here, from receiving Indicator_L, UE2 can be notified of the localized chunks to be allocated to it according to the localized allocation scheme.

Indicator_D and Indicator_L can be indicated by using one bit. Moreover, information related to a localized chunk can be implemented in various ways. For example, if a localized chunk (i.e., Chunk_L) is classified using an index, the information related to the localized chunk signifies an index. If an index for a certain localized index is to be transmitted, information related to the entire index or a part of the index can be transmitted. For example, if the index of the localized chunks includes integers whose values are consecutive, only the largest integer value and the smallest integer value are transmitted to provide index information of a specific localized chunk. Here, the largest integer value and the smallest integer value of the index can be alternatively indicated by the smallest integer value and a number of chunks used.

Hereafter, a method of transmitting control information according to embodiment #6 when the transmitting end allocates the localized chunks and the distributed chunks is explained. Preferably, the transmitting end transmits a first indicator, which indicates the distributed chunks allocated to UE1, and information only on the distributed chunks allocated to UE1. Furthermore, preferably, the transmitting end transmits a second indicator, which indicates the localized chunks allocated to UE2, and information on the distributed chunks allocated to all UEs according to the distribute allocation scheme, and information related to the localized chunks allocated to UE2.

The distributed chunks are allocated before the localized chunks. Further, if UE1 has the information related to the first allocated distributed chunks for UE1, information related to resource allocation can be accurately determined. From receiving the first indicator, UE1 knows that the distributed chunks are to be allocated to it.

Although the localized chunks are not allocated to UE2, UE2 has to have information related to the distributed chunks. If UE2 only has the information on the localized chunks for UE2, there can be a conflict between the distributed chunks and the wireless resources (e.g., subcarriers) of the localized chunks for UE2. Furthermore, UE2 receives information on the localized chunks for UE2 and information on the distributed chunks allocated to all UEs. Here, from receiving the second indicator, UE2 can be notified of the localized chunks to be allocated to it according to the localized allocation scheme.

The first indicator and the second indicator can be represented by using one bit. Furthermore, selecting any one of the first indicator or the second indicator, the receiving end can provide the type of the allocated chunk based on the selected identifier. Here, information related to a localized chunk and a distributed chunk can be implemented in various ways. For example, if a localized chunk (i.e., Chunk_L) or a distributed chunk (i.e., Chunk_D) is classified using an index, the information related to the localized chunk or the distributed chunk signifies an index. If an index for a certain localized index or a distributed index is to be transmitted, information related to the entire index or a part of the index can be transmitted. For example, if the index of the localized chunks or the distributed chunks includes integers whose values are consecutive, only the largest integer value and the smallest integer value are transmitted to provide index information of a specific localized chunk. Here, the largest integer value and the smallest integer value of the index can be alternatively indicated by the smallest integer value and a number of chunks used.

Embodiment #7

Embodiment #7 of the present invention relates to transmitting information related to wireless resources by a receiving end (e.g., UE). More specifically, when the resources (e.g., subcarriers) are allocated, a transmission method of control information related to resource allocation changes. Here, embodiment #7 introduces a more efficient method for transmitting the control information related to resource allocation than embodiment #6. In detail, embodiment #7 introduces an integrated index to transmit resource allocation information. The user receiving the integrated index can be provided with the type of the allocated chunks and the number of the allocated chunks.

Provided below is a method of transmitting control information according to embodiment #7 when the transmitting end allocates the localized chunks only is explained. The transmitting end transmits an integrated index, which identifies the chunks allocated to each UE, to UE1 and UE2. Here, UE1 is allocated the localized chunks according to the distributed allocation scheme, and UE2 is allocated the localized chunks according to the localized allocation scheme. The integrated index includes information of D Index and L Index. For example, a number of the chunks allocated according to the distributed allocation scheme is represented by '$N_i$' while a number of the chunks allocated according to the localized allocation scheme is represented by '$N_j$'. Here, assume that the number of $N_i + N_j$ are fixed.

Referring to the index, the values of D Index can be mapped to $1^{st}$-$N_i$th values of the integrated index, and the values of L Index can be mapped to $(N_i+1)$th-$(N_i+N_j)$th values of the integrated index. If the transmitting end provides the value of $N_i$ and the integrated index, the receiving end can determine the chunks which are allocated to it. That is, the receiving end compares the values of the integrated index to the values of $N_i$. Based on the comparison, the integrated index value being smaller than the value of $N_i$ indicates that the integrated index represents D Index. Alternatively, the integrated index value being larger than the value of $N_i$ indicates that the integrated index represents L Index. Here, the mapping relationship between D Index/L Index and the integrated index can be provided to the transmitting/receiving ends.

If the integrated index provides $N_i+N_j$ values to the transmitting/receiving ends, the transmitting end can transmit $N_j$, instead of the number of $N_i$, to provide $N_i$ to the receiving end. That is, the values of L Index can be mapped to $1^{st}$-$N_i$th values of the integrated index, and the values of D Index can be mapped to $(N_i+1)$th-$(N_i+N_j)$th values of the integrated index.

In another example related to embodiment #7, a method of transmitting control information when the transmitting end allocates the localized chunks and the distributed chunks is explained. The transmitting end transmits an integrated index, which identifies the chunks allocated to each UE, to UE1 and UE2. Here, UE1 is allocated the distributed chunks, and UE2 is allocated the localized chunks. For example, an index related to the distributed chunks can be represented by $1^{st}$-$N_i$th values, an index related to the localized chunks can be represented by $1^{st}$-$N_j$th values, and an integrated index can be represented by $1^{st}$-$(N_i+N_j)$th values. In the integrated index, the index representing $1^{st}$-$N_i$th values indicates the localized chunks allocated according to the distributed allocation scheme, the index representing $(N_i+1)$th-$(N_i+N_j)$th values indicates the localized chunks allocated according to the localized allocation scheme. Assuming that the number of $(N_i+N_j)$ values are constant/fixed, if the transmitting end provides $N_i$ and the localized chunks allocated to a specific user via the integrated index, the receiving end can determine the chunks that are allocated to it. That is, the receiving end compares the received integrated index against $N_i$, and determines whether the integrated index relates to the localized chunks or to the distributed chunks. As such, the integrated index can provide not only the index information but an identifier function as well.

Alternatively, the integrated index can be implemented differently from the example of above. For example, an index of $1^{st}$-$N_i$th values can represent the localized chunks, and an index of $(N_i+1th)$-$(N_i+N_j)$ values can represent the distributed chunks. If the transmitting end and the receiving end are provided with $N_i+N_j$ values, the transmitting end can transmit $N_j$, instead of the number of $N_i$, to provide $N_i$ to the receiving end.

By using the integrated index, the chunk type allocated to the receiving end and the index for the chunk can be provided without sending a separate indicator to the receiving end.

Embodiments #1-#5 relating to a method of resource allocation and embodiments #6-#7 relating to transmitting information on resource allocation can be combined. An ordinary skilled in the art would understand that the resource allocation method and the method of transmitting information related to resource allocation can be used together. Hereafter, further examples based on combination of aforementioned embodiments are provided but are not limited to the following examples.

Figure 9A:
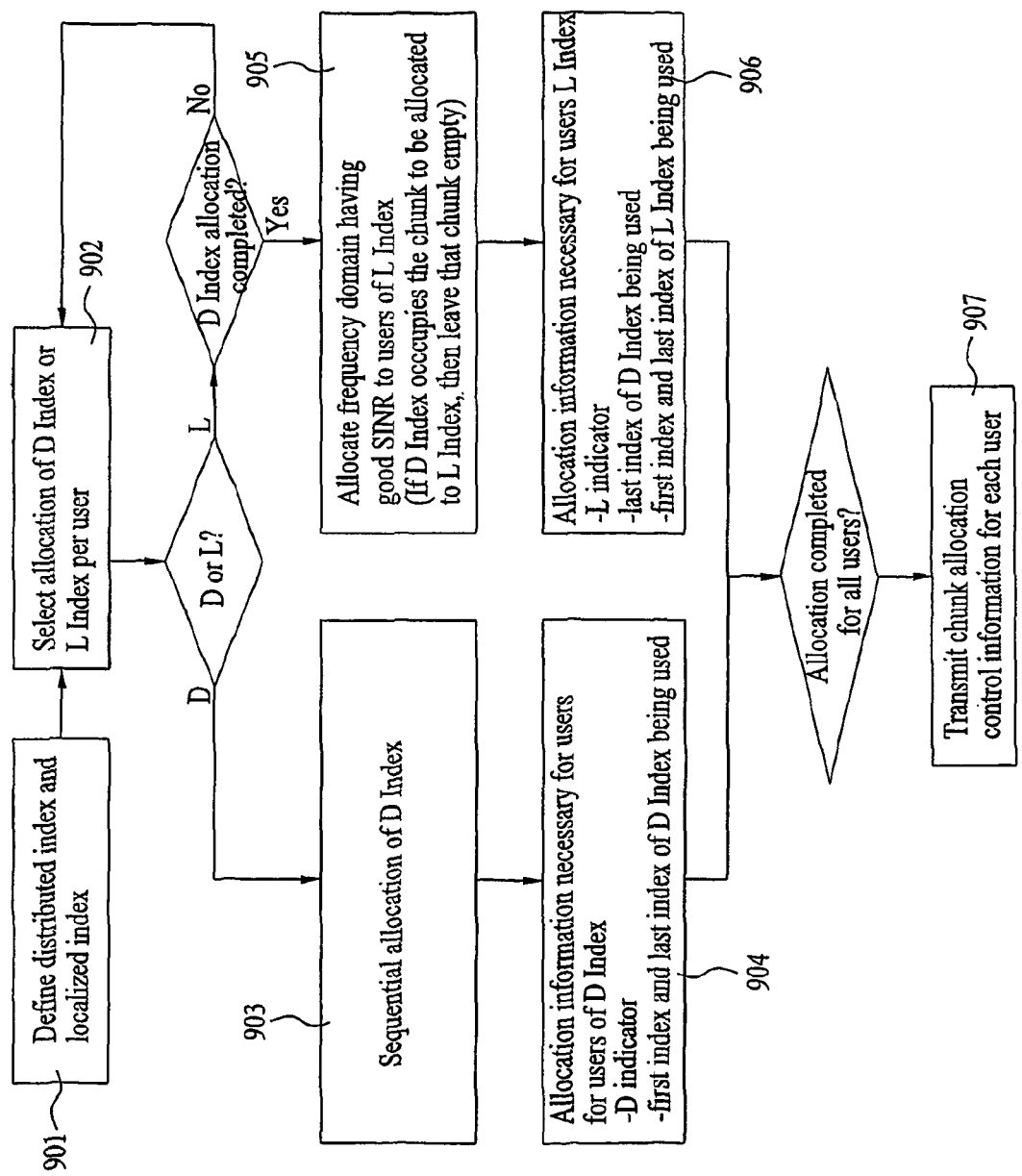
FIG. 9a illustrates a method of allocating wireless resources based on combination of embodiment #1 and embodiment #6.

FIG. 9a illustrates a method of allocating wireless resources based on the combination of embodiment #1 and embodiment #6. In FIG. 9a, a relationship between two (2) indices and a frequency resource is determined. That is, L Index and D Index are determined, and also, which frequency resource (e.g., subcarriers) is allocated to which index is determined (S901). Here, information on the index and the frequency resources are provided to the transmitting end and the receiving end.

The transmitting end determines whether to allocate the localized chunks according to the distributed allocation scheme or the localized allocation scheme for each UE (S902). First, assume that the distributed allocation scheme is selected. In this case, the transmitting having the scheduling function allocates D Index consecutively (S903). Upon completion of allocation, the transmitting end generates control information on resource allocation (S904). Thereafter, the transmitting end generates Indicator_D for the UE according to embodiment #6 and also generates information on the localized chunks allocated to the UE. Here, the information on the localized chunks indicates a first index and a last index of D Index allocated to the UE.

Since the transmitting end allocates consecutively the D Index, D Index for a specific UE continues. Furthermore, the receiving end can determine the wireless resources (e.g., subcarriers) which are allocated to it from receiving the information on first index and last index of D Index. Here, the information on start/first and end/last of D Index refers to indicating a first index and a last index or the first index and a total number of chunks allocated to the UE. Alternatively, the information can also refer to the total number of index and the last index allocated to the UE, for example.

After the localized chunks are allocated according to the distributed allocation scheme, the localized chunks are allocated according to the localized allocation scheme. If the transmitting end allocates the localized chunks, it is preferable that the localized chunks having good Signal-to-Noise Ratio (SINR) with respect to a particular UE are allocated to the particular UE. The transmitting end allocates the localized chunks according to the localized allocation scheme in a way that they do not overlap with the localized chunks allocated according to the distributed allocation scheme (S905). Upon completion of allocation, control information on the allocated resources is generated (S906). Thereafter, the transmitting end generates Indicator_L for the UE according to embodiment #6 and also generates information on the localized chunks allocated to the UE. Here, the information on the localized chunks indicates a first index and a last index of L Index allocated to the UE. Furthermore, the information related to the localized chunks allocated according to the distributed allocation scheme to all UEs signifies the last value of D Index. As mentioned above, if D Index is allocated in sequence, the UE can determine the range or scope of D Index using the last value of D Index. Furthermore, by knowing the range of D Index, a conflict between L Index, to which the UE belongs, and D Index can be avoided. In addition, as illustrated in FIG. 4a, the UE can distinguish the information related to D Index and L Index, which are mutually exclusively allocated, by having the range of D Index. Here, information on the first index and the last index of the index can be substituted with the information on the first index and a total number of allocated chunks. Further, it is possible to directly provide information on a total number of the localized chunks as the last value of D Index. Alternatively, the information can also refer to the total number of index and the last index allocated to the UE, for example.

The information on the resource allocation can be transmitted to an UE via a control channel (S907). However, the transmission of the resource allocation information is not limited to being transmitted trough the control channel but can also be transmitted via other channels. D Index for a specific UE and L Index for a specific UE can be transmitted via a dedicated channel for the specific UE. Preferably, the information provided to all UEs, like the last value of D Index, should be transmitted via a common channel.

Figure 10A:
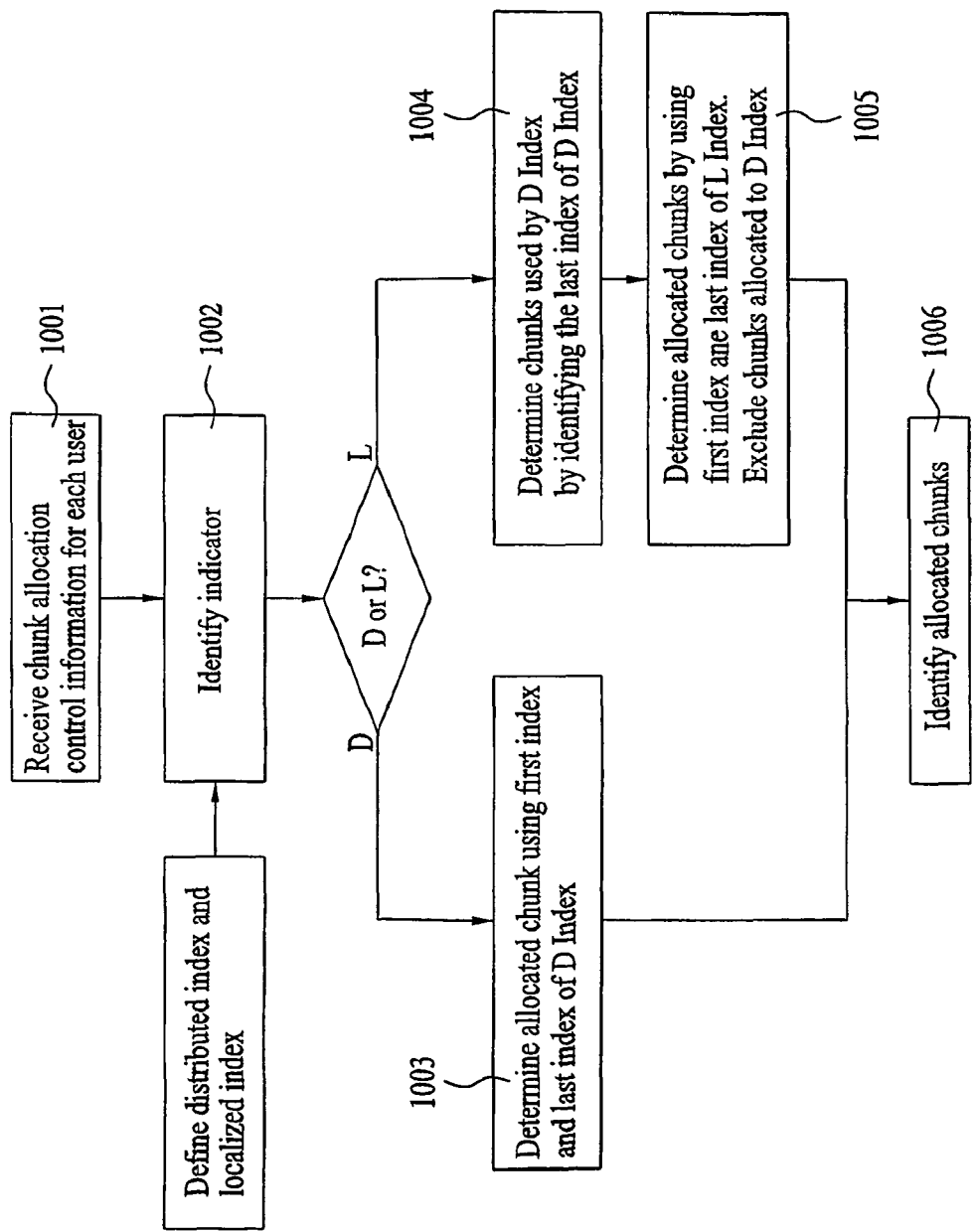
FIG. 10a illustrates an UE which receives wireless resource allocation information when a combination of embodiment #1 and embodiment #6 is used.

FIG. 10a illustrates an UE which receives wireless resource allocation information when a combination of embodiment #1 and embodiment #6 is used. First, the UE receives each UE specific control signal (S1001) and determines using the identifier whether the allocated chunks are based on a distributed allocation scheme or a localized allocation scheme (S1002). Here, the indicator can be represented in 1 bit, for example. If the localized chunks are allocated according to the distributed allocation scheme, these allocated localized chunks are identified by looking at a first index and a last index of D Index (S1003). Alternatively, if the localized allocated chunks are allocated according to the localized allocation scheme, the localized chunks allocated according to the distributed allocation scheme is determined based on the last index of D Index (S1004). The UE receives allocated L Index to determine the localized chunks which are allocated to it (S1005). In step S1005, when the localized chunks are identified using L Index, the UE can identify the allocated localized chunks from the wireless resources in which all of the localized chunks allocated according to the distributed allocation scheme are excluded. Here, the transmitting end can determine the first index and the last index by providing a first index and a number of chunks allocated to the UE instead of the first index and the last index of the corresponding index.

Next, the application of embodiment #6 with respect to FIG. 10a will be explained. First, the localized chunks corresponding to 0-5 of D Index for UE1 is allocated, and the localized chunks are consecutively allocated to 6-9 of D Index for UE3. Here, the last index of D Index is 9. The transmitting end transmits a first index '0' and a last index '5' of Indicator_D and D Index as resource allocation information to UE1. Further, the transmitting end transmits a first index '6' and a last index '9' of Indicator_D and D Index as resource allocation information to UE3. As for UE2, the transmitting end allocates chunks 0-10 of L Index. Here, since indices 1, 4, and 9 of L Index are already used or occupied by D Index, these chunks or slots are not occupied by L Index. Furthermore, there are eight (8) localized chunks to be allocated for UE2. As such, the transmitting end transmits the last index of D Index (i.e., Index 9), Indicator_L, the first index of L Index (i.e., Index 0), and the last index of L Index (i.e., Index 10) as the resource allocation information of UE2. Similarly for UE4, IL=11-30 of L Index are allocated. That is, the transmitting end transmits the last index of D Index (i.e., Index 9), Indicator_L, the first index of L Index (i.e., Index 11), and the last index of L Index (i.e., Index 30) as the resource allocation information of UE2.

Hereafter, more detailed description of transmitting the resource allocation information using the integrated index according to embodiment #7 will be explained.

The integrated index will be referred to as '$I_M$', D Index will be referred to as '$I_D$', L Index will be referred to as '$I_L$'. As illustrated in FIG. 4a, $I_D$ and $I_L$ can be represented by any one of the index from Index 0-Index 31. Since a total number of chunks with respect to $I_D$ and $I_L$ are fixed to 32, $I_D$ and $I_L$ can be combined with $I_M$ having Index 0-Index 31.

The following is an example of $I_M$ combined with $I_D$ and $I_L$. If an integrated index is implemented with respect to D Index, $I_M=I_D$ is maintained. More specifically, $I_D$ is allocated in sequence, and $I_D$ can be represented by any one of the index from Index 0-Index 9. In addition, if an integrated index is implemented with respect to L Index, $I_L$ is mapped to any one of Index 0-Index 21 in order to prevent overlapping of $I_D$ and $I_L$. Here, if the mapped index is referred to as $I_L'$, the relationship between $I_L'$ and $I_L$ and $I_M$ can be represented by Table 9.

TABLE 9

| $I_D$ | $I_M$ |
|---|---|
| 0 | 0 |
| 1 | 1 |
| 2 | 2 |
| 3 | 3 |
| 4 | 4 |
| 5 | 5 |
| 6 | 6 |
| 7 | 7 |
| 8 | 8 |

TABLE 9-continued

| | 9 | 9 |
|---|---|---|
| $I_L$ | $I_{L'}$ | $I_{L'} + N_{DT}$ |
| 0 | 0 | 10 |
| 2 | 1 | 11 |
| 3 | 2 | 12 |
| 5 | 3 | 13 |
| 6 | 4 | 14 |
| 7 | 5 | 15 |
| 8 | 6 | 16 |
| 10 | 7 | 17 |
| 11 | 8 | 18 |
| 13 | 9 | 19 |
| 14 | 10 | 20 |
| 16 | 11 | 21 |
| 17 | 12 | 22 |
| 0 | 13 | 23 |
| 21 | 14 | 24 |
| 22 | 15 | 25 |
| 23 | 16 | 26 |
| 24 | 17 | 27 |
| 25 | 18 | 28 |
| 28 | 19 | 29 |
| 29 | 20 | 30 |
| 30 | 21 | 31 |

Referring to Table 9, $N_{DT}$ represents a number of the localized chunks based on the distributed allocation scheme. When $N_{DT}$ and the integrated index are transmitted from the transmitting end, the receiving end can apply in reverse the relationship represented in Table 9 to determine the resources allocated to it. For example, the wireless resource can be transmitted to UE2 via $N_{DT}=10$ and $I_M$ of 11 can be transmitted. Here, by determining that the value of $I_M$ is bigger than the value of $N_{DT}$, the UE2 realizes that the localized chunks allocated according to the localized allocation scheme are allocated to it. Moreover, $N_{DT}$ is subtracted from $I_M$ to acquire a value of '1' (i.e:, $I_{L'}=1$) and using this, the UE2 learns that it has received a chunk corresponding to $I_L=2$. Since UE already has information as to which frequency domain the chunk corresponding to index 2 of L Index represents, the UE can accurately receive the wireless resource.

The transmitting end can transmit a number of the localized chunks allocated according to the localized allocation scheme in addition to transmitting $N_{DT}$. If the value of $N_{DT}+N_{LT}$ is fixed, the demarcation point of L Index and D Index can be identified using the value of $N_{LT}$.

Hereafter, another description of transmitting the resource allocation information using the integrated index according to embodiment #7 will be explained.

TABLE 10

| $I_L$ | $I_D$ | $I_M$ | Index |
|---|---|---|---|
| 0 | No Data | 0 | L |
| No Data | 1 | 1 | D |
| 2 | No Data | 2 | L |
| 3 | No Data | 3 | L |
| No Data | 7 | 4 | D |
| 5 | No Data | 5 | L |
| 6 | No Data | 6 | L |
| 7 | No Data | 7 | L |
| 8 | No Data | 8 | L |
| No Data | 4 | 9 | D |
| 10 | No Data | 10 | L |
| 11 | No Data | 11 | L |
| No Data | 3 | 12 | D |
| 13 | No Data | 13 | L |
| 14 | No Data | 14 | L |
| No Data | 6 | 15 | D |
| 16 | No Data | 16 | L |
| 17 | No Data | 17 | L |
| No Data | 0 | 18 | D |
| No Data | 8 | 19 | D |
| 20 | No Data | 20 | L |
| 21 | No Data | 21 | L |
| 22 | No Data | 22 | L |
| 23 | No Data | 23 | L |
| 24 | No Data | 24 | L |
| 25 | No Data | 25 | L |
| No Data | 9 | 26 | D |
| No Data | 6 | 27 | D |
| 28 | No Data | 28 | L |
| 29 | No Data | 29 | L |
| 30 | No Data | 30 | D |
| No Data | 2 | 31 | L |

The transmitting end according to Table 10 transmits the integrated index 0-31. That is, the transmitting end sets $I_M=I_L$ and transmits the integrated index. In other words, unchanged or a fixed L Index is transmitted. However, since certain portions of L Index are not used, there are certain unused $I_M$ from Index 0-Index 31 as well. Subsequently, D Index is allocated to $I_M$ not having any value allocated thereto, or put differently, to an empty $I_M$. Thereafter, the transmitting end sends information related to N along with D Index.

The UE uses the value of $I_M$ and the value of $I_L$ interchangeably. For example, if the value of $I_M$ received by the UE is 7, the UE can determine that it has received the chunk corresponding to L Index 7. However, since UE also receives information on $N_{DT}=10$, the UE recognizes that it cannot receive $I_L$ having values of 1, 4, 9, 12, 15, 18, 19, 26, 27, and 31. If the UE receives $I_M$ have the value of 4, the UE can determine that it has received a chunk corresponding to index 7 of D Index according to the relationships of Table 10. The relationship between a specific D Index and a frequency resource are known by both the transmitting end and the receiving end, and as such, the UE can receive accurate resource allocation.

Figure 9B:
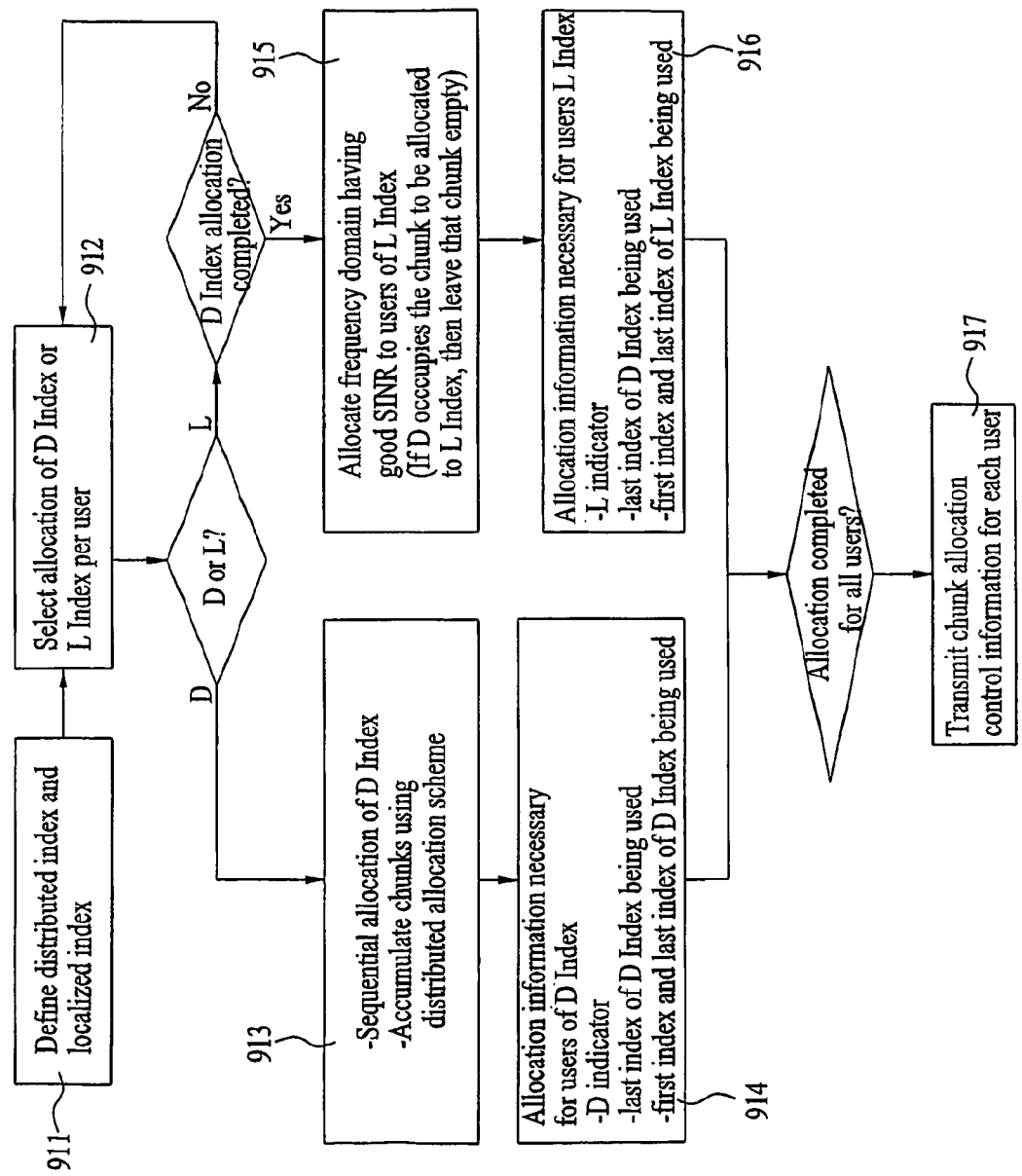
FIG. 9b illustrates a method of allocating wireless resources based on combination of embodiment #2 and embodiment #6.

Hereafter, an example of using embodiment #2 and the resource allocation transmission method are provided. To better explain this, refer to FIG. 9b which uses embodiment #2 and embodiment #6. Embodiment #2 provides a specific chunk to more than one UE, and uses D Index and L Index to allocate resources as is the case in embodiment #1.

First, the relationship between two indices of FIG. 5a and the frequency resources are established. That is, the relationship between D Index for a plurality of UEs and L Index for each UE are established, as well as the relationship regarding which index is mapped to which frequency resource (e.g., subcarriers) is also established (S911). Similarly to the examples of above, the information on the indices and the frequency resources are provided to both the transmitting end and the receiving end.

The transmitting end determines whether to allocate the localized chunks according to the distributed allocation scheme or the localized allocation scheme (S912). First, explanation with respect to allocating the localized chunks according to the distributed allocation scheme will be presented.

In detail, a transmitting end having scheduling function allocates D Index in sequence/consecutively and keeps track of a number of used or allocated chunks in aggregate (S913). That is, the number of chunks shared or used by a plurality of users is recorded. Upon completion of step S913, the transmitting end generates control information related to resource allocation (S914). Thereafter, the transmitting end generates Indicator_D for the UE according to embodiment #6 and also generates information on the localized chunks allocated to the UE. Here, the information on the localized chunks indicates a first index and a last index of D Index allocated to the UE.

Since the plurality of UEs share the localized chunks allocated according to the distributed allocation scheme, the plurality of UEs can be allocated the same distributed chunks and the localized chunks. The transmitting end keeps record of the localized chunks used for distributing chunks to determine the total number of the localized chunks allocated to distributed chunks. This value can be determined based on the last index of the D Index. The location of the localized chunks to be shared by all the UEs can be identified by using the last index of D Index. In addition, using the first index and the last index of D Index provided to each UE, each UE, corresponding to the localized chunks allocated according to the distributed allocation scheme, can determine the location to be used and its corresponding capacity. Furthermore, the UE can determine the allocated localized chunks upon receiving the information on the first index and the last index of D Index.

After allocating the localized chunks according to the distributed allocation scheme to various UEs, the localized chunks are further allocated according to the localized allocation scheme. If the localized chunks are allocated according to the localized allocation scheme at the transmitting end, preferably, the localized chunks having good SINR with respect to a particular UE are allocated to the particular UE. The transmitting end allocates the localized chunks according to the localized allocation scheme in a way that they do not overlap with the localized chunks allocated according to the distributed allocation scheme (S915). Upon completion of allocation, control information on the allocated resources is generated (S916). Thereafter, the transmitting end generates Indicator_L for the UE according to embodiment #6 and also generates information on the localized chunks allocated to the UE. Here, the information on the localized chunks indicates a first index and a last index of L Index allocated to the UE. Furthermore, the information related to the localized chunks allocated according to the distributed allocation scheme to all UEs signifies the last value of D Index. As mentioned above, D Index is allocated in sequence/consecutively, the UE can determine the range or scope of D Index using the last index value of D Index. Furthermore, by knowing the range of D Index, a conflict between L Index, to which the UE belongs, and D Index can be avoided. In addition, as illustrated in FIG. 5a, the UE can distinguish the information related to D Index and L Index, which are mutually exclusively allocated, by having the range of D Index. Here, information on the first index and the last index of the index can be substituted with the information on the first index and the number of allocated chunks. Further, it is possible to directly provide information on a total number of the localized chunks as the last index value of D Index.

The information on the resource allocation can be transmitted to an UE via a control channel (S917). However, the transmission of the resource allocation information is not limited to being transmitted through the control channel but can also be transmitted via other channels. D Index for a specific UE and L Index for a specific UE can be transmitted via a dedicated channel for the specific UE. Preferably, the information provided to all UEs, like the last value of D Index, should be transmitted via a common channel.

Figure 10B:
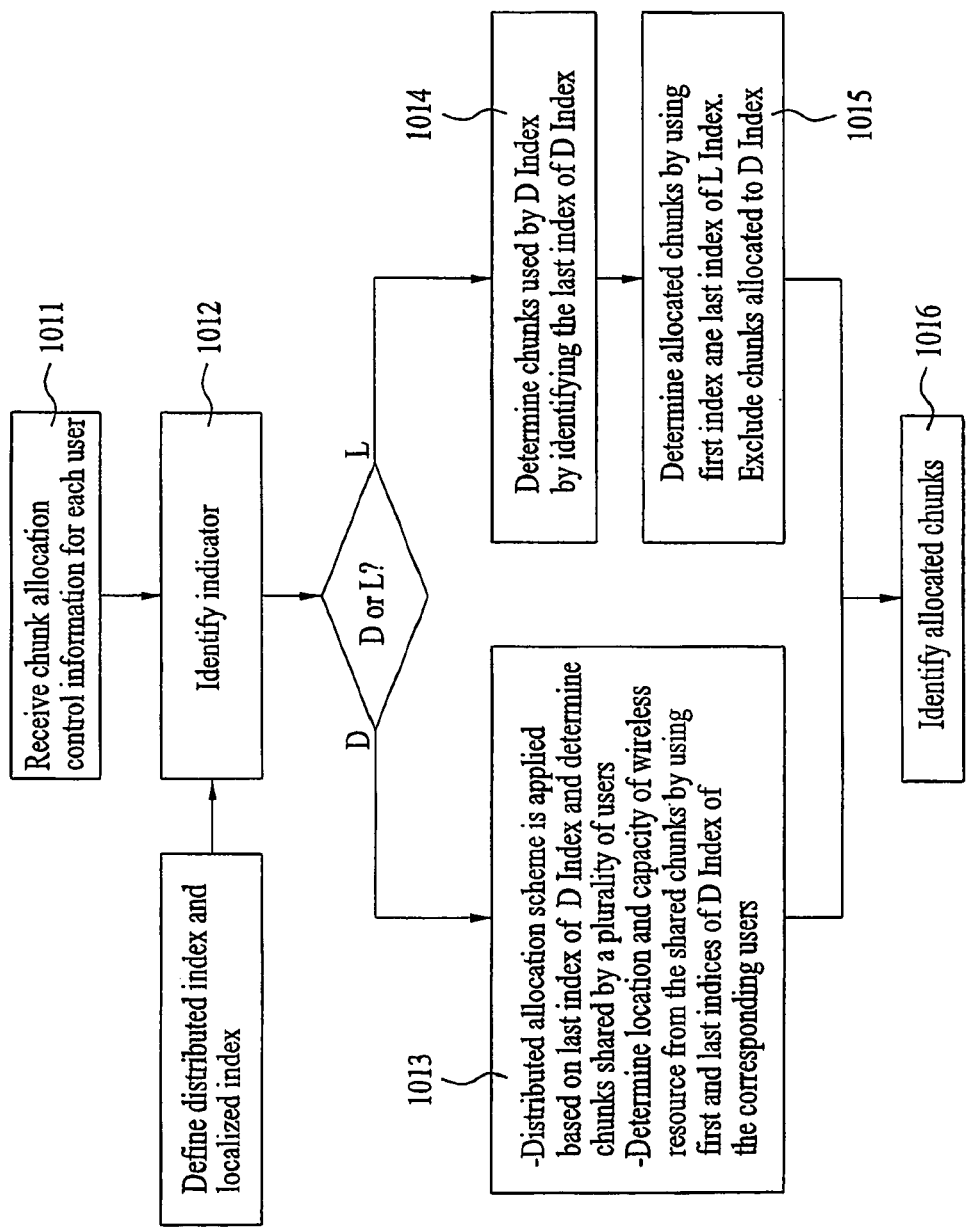
FIG. 10b illustrates an UE which receives resource allocation information when a combination of embodiment #2 and embodiment #6 is used.

FIG. 10b illustrates an UE which receives resource allocation information when a combination of embodiment #2 and embodiment #6 is used. First, the UE receives each UE specific control signal (S1011) and determines using the identifier whether the allocated chunks are based on a distributed allocation scheme or a localized allocation scheme (S1012). If the localized chunks are allocated according to the distributed allocation scheme, these allocated localized chunks are identified by looking at the last index of D Index (S1013). According to embodiment #2, since the localized chunks allocated according to the distributed allocation scheme are allocated to a plurality of UEs, using the first index and the last index of D Index provided to each UE, each UE, corresponding to the localized chunks allocated according to the distributed allocation scheme, can determine the location and the capacity of the allocated chunks.

Alternatively, if the localized allocated chunks are allocated according to the localized allocation scheme, the localized chunks allocated according to the distributed allocation scheme is determined based on the last index of D Index (S1014). The UE receives allocated L Index to determine the localized chunks which are allocated to it (S1016). In step S1016, when the localized chunks are identified using L Index, the UE can identify the allocated localized chunks from the wireless resources in which all of the localized chunks allocated according to the distributed allocation scheme are excluded. Here, the transmitting end can determine the first index and the last index based on providing a first index and a number of chunks that are being used instead of a first index and a last index of the index.

If the transmitting end provides a first index and a number of chunks being used instead of the first index and the last index, the receiving end can determine the first index, which is provided, and the last index by adding the number of chunks being used to the first index.

The resource allocation transmission method according to embodiment #2 can be different from the method of embodiment #1. Although embodiment #1 and embodiment #2 both allocate the localized chunks to either L Index or D Index, the chunks which are allocated by the distributed allocation scheme are allocated to a plurality of UEs. That is, if a UE is allocated localized chunks, the UE is not allocated all of the localized chunks but a specified ratio (e.g., 6/10 of entire chunks). However, the method associated with generating an integrated index is same for both embodiment #1 and embodiment #2. As illustrated in FIG. 5a, $I_D$ can be represented by Index 0-Index 31, $I_L$ can also be represented by Index 0-Index 31. However, a total number of chunks available to $I_D$ and $I_L$ are fixed to 32 chunks, and as such, $I_D$ and $I_L$ can be combined as $I_M$ having Index 0-Index 31 which represents an integrated index.

If the integrated index (i.e., $I_M$) is configured with respect to D Index, $I_M=I_D$. Since the chunks for D Index (i.e., $I_D$) are allocated consecutively, the distributed chunks for $I_D$ are allocated to Index 0-Index 9, in case of FIG. 5a. If the integrated index is configured with respect to L Index, the chunks for $I_L$ are allocated to indices between Index 0-Index 21 so as to prevent overlapping of $I_D$ and $I_L$. If the allocated chunk are referred to as $I_L'$, the relationship between $I_L$ and $I_L'$ and $I_M$ are depicted in Table 9. Furthermore, the integrated index based on Table 10 can be applied to embodiment #2 as well.

Figure 11:
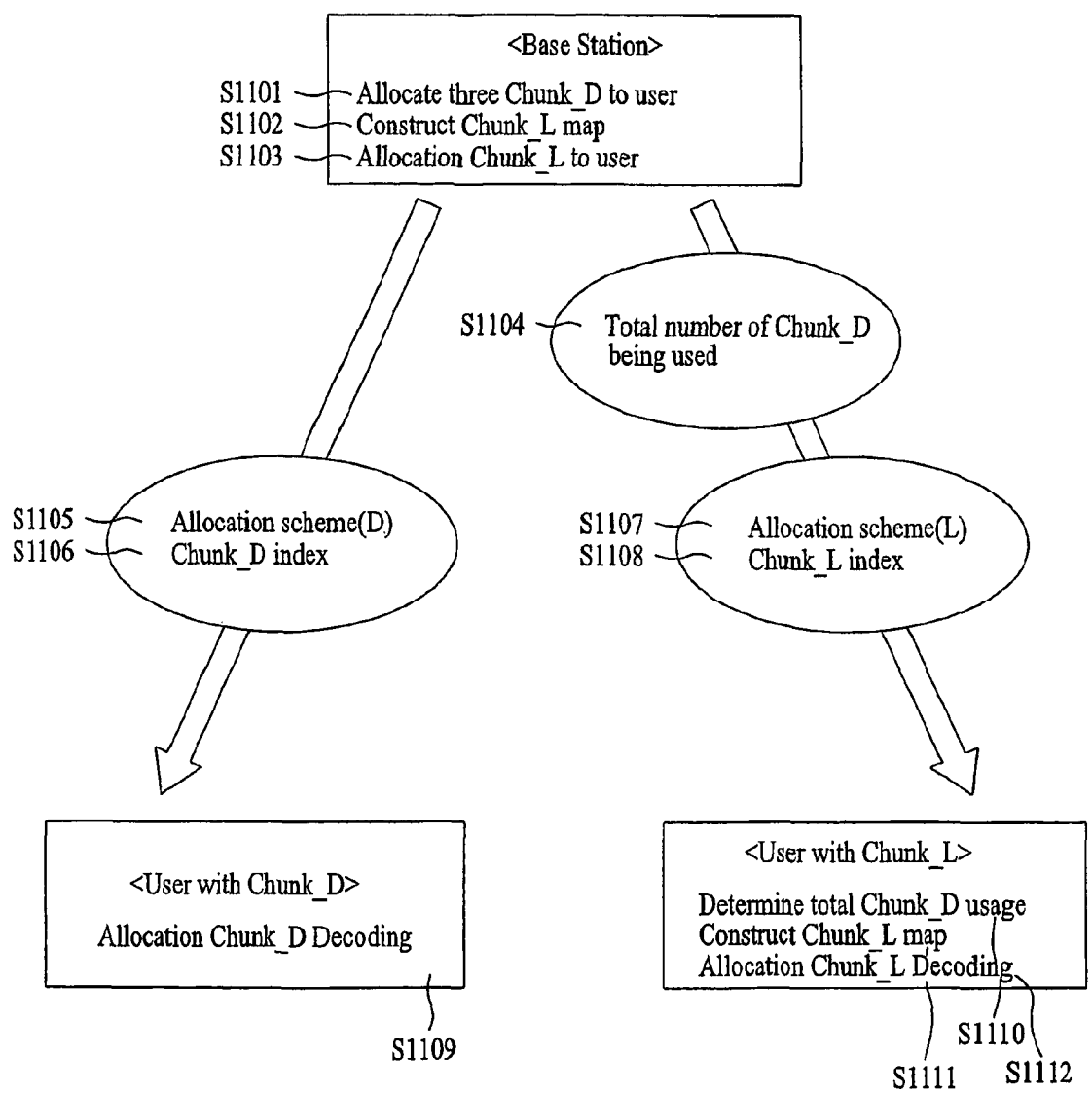
FIG. 11 illustrates allocating wireless resources based on embodiment #3 and embodiment #6.

FIG. 11 illustrates allocating wireless resources based on embodiment #3 and embodiment #6. In FIG. 11, the transmitting end sends control information associated with scheduling operation to the receiving end. Here, further discussions will be made with respect to FIG. 7.

The transmitting end (e.g., base station) performs scheduling operation. Through the scheduling function, a receiving end (e.g., UE) for allocating the distributed chunks can be determined, and a determination as to a number of the distributed chunks necessary for allocation is made (S1101). As illustrated in FIG. 7, in which the distributed chunks and the localized chunks are multiplexed, the transmitting end determines UE1 and UE2 for allocating the distributed chunks. Furthermore, the transmitting end assigns a number of the distributed chunks (i.e., Chunk_D) to be allocated to UE1 and UE2, and accordingly allocates Chunk_D1 and Chunk_D2 to UE1 while allocating Chunk_D3 to UE3. Preferably, the index for the chunks allocated to the UEs is represented by continuous numbers or put differently, the chunks are allocated consecutively. For example, Chunk_D1 and Chunk_D2 or Chunk_D2 and Chunk_D3, which are consecutive, should be allocated to UE1.

If an index indicating a plurality of the allocated chunks is transmitted to the receiving end, a size of the control information can get large which can cause problems. In addition, the transmitting end determines the distributed chunks (i.e., Chunk_D) to be included in the subcarriers either before or after the distributed chunks are allocated to the UE.

Since the transmitting end allocates the wireless resources (e.g., subcarriers) to the distributed chunks, the remaining wireless resources can be allocated to the localized chunks. That is, the transmitting end constructs a map for the localized chunks (S1102). The map for the localized chunks illustrates, as in FIG. 7, which chunk is transmitted via which frequency-time resource. By constructing the map, the subcarriers included in the localized chunks can be determined.

As discussed above, since each chunk is allocated to at least one receiving end (e.g., UE), the transmitting end determines which receiving end to allocate the localized chunks (S1103). Referring to FIG. 11, Chunk_L-Chunk_L4 are allocated to UE3, and Chunk_L5 and Chunk_L10 are allocated to UE4. Alternatively, it is possible for a UE to be simultaneously allocated the localized chunks and the distributed chunks. As such, the present invention is not limited to the embodiment of FIG. 11.

The control information discussed with respect to steps S1101-S1103 is transmitted to a UE. Preferably, the control information uses the corresponding information and is transmitted via a different transmission path. After having been allocated the distributed chunks according to embodiment #6, the receiving end receives a first indicator which notifies whether the allocated chunks are localized chunks or distributed chunks (S1105). Here, the first indicator can be indicated by using one (1) bit. Furthermore, the receiving end further receives index for identifying each chunk (S1106). The steps S1105-S1106 can be transmitted via a dedicated channel or dedicated signaling. For example, after receiving the distributed chunks, which is also received by UE1, the receiving end receives the first indicator and further receives index information indicating that Chunk_D1 and Chunk_D2 are allocated to the receiving end. If UE1 receives information related to the first indicator and the index, UE1 can determine which subcarrier is used to deliver the chunks. If there are three (3) distributed chunks, subcarriers 1, 11, 21, 31, 41, 51, 61, and 71 are allocated to Chunk_D1, subcarriers 7, 17, 27, 37, 47, 57, 67, and 77 are allocated to Chunk_D2, and subcarriers 3, 13, 23, 33, 43, 53, 63, and 73 are allocated to Chunk_D3. This arrangement or information is shared, in advance, by both the transmitting end and the receiving end. As such, UE1 uses the first identifier and the index information to receive and decode Chunk_D1 and Chunk_D2 (S1109).

Preferably, after receiving the localized chunks, which is also received by UE3 and UE4, the receiving end a number of the distributed chunks used for allocation by the transmitting end via common signaling (S1104, S1110). Thereafter, the receiving end further receives a first indicator for identifying the allocation scheme (S1107) and an index for identifying each chunk (S1108). Here, because a map for the localized chunks cannot be constructed if the number of the distributed chunks is not received, even with the first indicator and the index, the number of the distributed chunks has to be received. The steps S1108-S1109 can be transmitted via dedicated signaling or dedicated channel, for example.

Hereinafter, transmitting of the allocated wireless resources in view of embodiment #4 will be explained. In FIG. 11, the transmitting end sends control information associated with scheduling operation to the receiving end. Here, further discussions will be made with respect to FIG. 8.

The transmitting end (e.g., base station) performs scheduling operation. Through the scheduling function, a receiving end (e.g., UE) for allocating the distributed chunks can be determined, and a determination as to a number of the distributed chunks necessary for allocation is made (S1101). As illustrated in FIG. 8, in which the distributed chunks and the localized chunks are multiplexed, the transmitting end determines UE1 and UE2 for allocating the distributed chunks. Furthermore, the transmitting end assigns a number of the distributed chunks (i.e., Chunk_D) to be allocated to UE1 and UE2, and accordingly allocates Chunk_D1 and Chunk_D2 to UE1 while allocating Chunk_D3 to UE3. Preferably, the index for the chunks allocated to the UEs is represented by continuous numbers or put differently, the chunks are allocated consecutively. For example, Chunk_D1 and Chunk_D2 or Chunk_D2 and Chunk_D3, which are consecutive, should be allocated to UE1.

If an index indicating a plurality of the allocated chunks is transmitted to the receiving end, a size of the control information can get large which can cause problems. In addition, the transmitting end determines the distributed chunks (i.e., Chunk_D) to be included in the subcarriers either before or after the distributed chunks are allocated to the UE.

Since the transmitting end allocates the wireless resources (e.g., subcarriers) to the distributed chunks, the remaining wireless resources can be allocated to the localized chunks. That is, the transmitting end constructs a map for the localized chunks (S1102). The map for the localized chunks illustrates, as in FIG. 7, which chunk is transmitted via which frequency-time resource. By constructing the map, the subcarriers included in the localized chunks can be determined. With increasing number of subcarriers for Chunk_D1, Chunk_D2, and Chunk_D3, a number of subcarriers for the localized chunks decreases. Here, the number of subcarriers included in each localized chunk (i.e., Chunk_L) can be fixed or constant. For example, as illustrated in FIG. 8, subcarriers 2, 4, 5, 6, 8, 9, 10, and 12 can be allocated to Chunk_L1.

As discussed above, since each chunk is allocated to at least one receiving end (e.g., UE), the transmitting end determines which receiving end to allocate the localized chunks (S1103). Referring to FIG. 11, Chunk_L1-Chunk_L4 are allocated to UE3, and Chunk_L5 and Chunk_L7 are allocated to UE4. Alternatively, it is possible for a UE to be simultaneously allocated the localized chunks and the distributed chunks. As such, the present invention is not limited to the embodiment of FIG. 11.

The control information discussed with respect to steps S1101-S1103 is transmitted to a UE. Preferably, the control information uses the corresponding information and is transmitted via a different transmission path. After having been allocated the distributed chunks according to embodiment #6, the receiving end receives a first indicator which notifies whether the allocated chunks are localized chunks or distributed chunks (S1105). Here, the first indicator can be indicated by using one (1) bit. Furthermore, the receiving end further receives index for identifying each chunk (S1106). For example, after receiving the distributed chunks, which is also received by UE1, the receiving end receives the first indicator and further receives index information indicating that Chunk_D1 and Chunk_D2 are allocated to the receiving end. If UE1 receives information related to the first indicator and the index, UE1 can determine which subcarrier is used to deliver the chunks. If there are three (3) distributed chunks, subcarriers 1, 11, 21, 31, 41, 51, 61, and 71 are allocated to Chunk_D1, subcarriers 7, 17, 27, 37, 47, 57, 67, and 77 are allocated to Chunk_D2, and subcarriers 3, 13, 23, 33, 43, 53, 63, and 73 are allocated to Chunk_D3. This arrangement or information is shared, in advance, by both the transmitting end and the receiving end. As such, UE1 uses the first identifier and the index information to receive and decode Chunk_D1 and Chunk_D2 (S1109).

Preferably, after receiving the localized chunks, which is also received by UE3 and UE4, the receiving end a number of the distributed chunks used for allocation by the transmitting end via common signaling (S1104, S1110). Thereafter, the receiving end further receives a first indicator for identifying the allocation scheme (S1107) and an index for identifying each chunk (S1108). Here, because a map for the localized chunks cannot be constructed if the number of the distributed chunks is not received, even with the first indicator and the index, the number of the distributed chunks has to be received.

Assume that a number of subcarriers for the distributed chunks (i.e., Chunk_D) is referred to a $S_D$, a number of subcarriers for the localized chunks (i.e., Chunk_L) is referred to as $S_L$, a total number of the subcarriers is referred to as $S_T$, a number of the distributed chunks is referred to as $N_D$, a number of the localized chunks is referred to as $N_L$, and a combined number of $N_D$ and $N_L$ is referred to as $N_T$. Here, $S_T$ represents a sum of the number of chunks multiplied by the number of subcarriers in each chunk. To put it differently, $S_T = N_D S_D + N_L S_L$. Using $S_T$, $S_D$, and $S_L$, a number of $N_L$ can be acquired based on the number of $N_D$, or on the contrary, the number of $N_D$ can be acquired based on the number of $N_L$.

$S_T$, $S_D$, and $S_L$ are determined at the initial stage of transmission or can be provided to the transmitting end and the receiving end in advance via a dedicated channel. Furthermore, since $S_T$, $S_D$, and $S_L$ can be provided by various means, the non-transmitted values can be determined by transmitting only the number of the distributed chunks (i.e., $N_D$) or the number of the localized chunks (i.e., $N_L$). In addition, the receiving end can decode accurately by being provided with the number of the localized chunks instead of the distributed chunks.

In the present embodiment, it is possible to modify a method of indicating the index information and transmit control information on scheduling to the receiving end, without transmitting the information regarding the allocation scheme. Hereinafter, the control information of the resource allocation scheme according to embodiment #4 can be transmitted via an integrated index of embodiment #7.

If an integrated index in which no overlap between the index of the distributed chunks and the index of the localized chunks exists and the transmitting end and the receiving end share the integrated index, the transmitting end does not need to separately transmit the information related to allocation scheme, such as the first indicator and/or Indicator_D. Consequently, wireless resources can be managed more efficiently.

For example, assume that a number of the distributed chunks allocated to an OFDM subframe is referred to as $N_D$, a number of the localized chunks is referred to as $N_L$, a sum of $N_D$ and $N_L$ is $N_T$, an index of the distributed chunks is referred to as $I_D$, and an index of the localized chunks is referred to as $I_L$. Here, the value of $I_D$ can be any value between 1-$N_D$, and the value of $I_L$ can be any value between 1-$N_L$. The index for the distributed chunks and the index for the localized chunks can be distinguished by using an integrated index (i.e., $I_N$).

The integrated index (i.e., $I_N$) can include information on the index for the distributed chunks and the index for the localized chunks by various means. The following is an example of $I_N$ including $I_D$ and $I_L$. According to the initial configuration or independent signaling between the transmitting end and the receiving end, the transmitting end can dedicate the front portion of $I_N$ for $I_D$ and assigns $I_L$ to the remaining portions of $I_N$. That is, if $I_N = I_D$ and $I_N = I_L + N_D$ and transmitted, $1 = I_N = I_D$ becomes $I_D = I_N$, and $N_D + 1 = I_N = N_D + N_L$ becomes $I_L = I_N - N_D$, and $I_D$ and $I_L$ can be distinguished without each allocation scheme.

In another example, the transmitting end includes information related to $I_L$ in the front portion of $I_N$ while including information related to $I_D$ in the remaining portion of $I_N$. That is, if $I_N = I_D$ and $I_N = I_D + N_L$ and transmitted, $1 = I_N = N_L$ becomes $I_L = I_N$, and $N_L + 1 = I_N = N_L + N_D$ becomes $I_D = I_N - N_L$, and $I_D$ and $I_L$ can be distinguished without each allocation scheme.

The integrated index ($I_N$) is an index in which $I_D$ and $I_L$ do not overlap while including both indices. As such, there is no restriction(s) in formulating the index. Preferably, $I_D$ and $I_L$ are allocated sequentially/consecutively.

In implementing this embodiment, the step S1105 is omitted and, the step S1106 relating to transmitting the index for identifying the chunks is modified or improved so that the information to allow decoding by the receiving end can be transmitted.

If $I_D$ is sequentially and continuously allocated, the transmitting end uses the number of the distributed chunks to determine that subcarriers 1, 11, 21, 31, 41, 51, 61, and 71 are allocated to Chunk_D1, subcarriers 7, 17, 27, 37, 47, 57, 67, and 77 are allocated to Chunk_D2, and subcarriers 3, 13, 23, 33, 43, 53, 63, and 73 are allocated to Chunk_D3. As for UE3, it receives the integrated index to learn that it has received the localized chunks (i.e., Chunk_L1, Chunk_L2, Chunk_L3, and Chunk_L4). With this information, UE3 can decode the localized chunks (S1112).

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The Invention claimed is:

1. A method of allocating wireless resources in a wireless communication system, the method comprising:
   allocating distributed chunks to at least one user equipment (UE) on a frequency domain, wherein the distributed chunks are localized chunks which are allocated to the wireless resources according to a distributed allocation scheme;
   constructing a map for allocating localized chunks in consideration of the allocated distributed chunks, wherein the localized chunks are the localized chunks allocated to the wireless resources according to a localized allocation scheme; and
   allocating the localized chunks to the at least one UE after all of the distributed chunks have been allocated,
   wherein the distributed chunks and the localized chunks are mutually exclusive.

2. The method of claim 1, wherein the wireless resources are subcarriers.

3. The method of claim 2, wherein the localized chunks include a specified number of subcarriers.

4. The method of claim 1, wherein the distributed allocation scheme allocates the localized chunks in a distributed manner.

5. The method of claim 4, wherein the localized chunks allocated in the distributed manner are non-consecutive.

6. The method of claim 4, wherein the localized chunks allocated in the distributed manner include a specified number of chunks distributed at predefined intervals apart.

7. The method of claim 1, wherein the localized allocation scheme allocates the localized chunks consecutively.

8. The method of claim 1, wherein the distributed chunks include a first set of allocated wireless resources for a first UE and a second set of allocated wireless resources for a second UE.

9. The method of claim 8, wherein the first set of allocated wireless resources and the second set of allocated wireless resources are mutually exclusive.

10. The method of claim 1, wherein each distributed chunk includes a specified number of wireless resources located predefined intervals apart.

11. The method of claim 1, wherein each localized chunk includes a specified number of consecutive wireless resources.

12. The method of claim 1, wherein each localized chunk includes a specified number of wireless resources.

13. The method of claim 12, wherein the distributed chunks include randomly allocated non-consecutive wireless resources.

14. The method of claim 12, wherein each localized chunk includes varying number of wireless resources.

15. The method of claim 12, wherein each localized chunk includes a fixed number of wireless resources.

16. The method of claim 1, wherein the map is constructed to leave specific wireless resources empty.

17. The method of claim 16, wherein the empty wireless resources correspond to wireless resources for the distributed chunks.

18. The method of claim 1, further comprising transmitting an indicator to indicate a chunk type and information related number of chunks allocated to each UE.

19. The method of claim 18, wherein the chunk type indicates whether the localized chunks are distributed chunks or localized chunks.

20. The method of claim 18, wherein the indicator is represented in 1 bit.

21. The method of claim 18, wherein the information includes a first chunk and a last chunk allocated to the corresponding UE.

22. The method of claim 18, wherein the information includes a first chunk and a total number of chunks allocated to the corresponding UE.

23. The method of claim 18, wherein the information includes a total number of chunks and a last chunk allocated to the corresponding UE.

24. The method of claim 18, wherein the indicator and the information are transmitted through a control channel.

25. The method of claim 1, wherein the frequency domain has good Signal-to-Noise Ratio (SINR).

26. A method of receiving allocated wireless resources in a wireless communication system, the method comprising:
   receiving an indicator from a transmitting end, wherein the indicator indicates a chunk type, wherein the chunk type includes distributed chunks and localized chunks;
   determining, first, the allocated wireless resources of the distributed chunks using a first allocated chunk and a last allocated chunk of the distributed chunks;
   determining, second, the last chunk allocated as the distributed chunk after all of the distributed chunks are allocated; and
   determining, third, the allocated wireless resources of the localized chunks using a first allocated chunk and a last allocated chunk of the localized chunks,
   wherein the wireless resources allocated to the distributed chunks are mutually exclusive with the localized chunks.

27. The method of claim 26, wherein the wireless resources are subcarriers.

28. The method of claim 26, wherein the allocated wireless resources of the distributed chunks are determined using a total number of chunks allocated to the distributed chunks and the last allocated chunk of the distributed chunks.

* * * * *